United States Patent
Adams

(10) Patent No.: US 12,261,907 B2
(45) Date of Patent: Mar. 25, 2025

(54) SYSTEM AND METHODS OF TRACKING PLAYER GAME EVENTS

(71) Applicant: Neil Patrick Adams, Waterloo (CA)

(72) Inventor: Neil Patrick Adams, Waterloo (CA)

(73) Assignee: MAD PUCK INC., Waterloo (CA)

( * ) Notice: Subject to any disclaimer, the term of this patent is extended or adjusted under 35 U.S.C. 154(b) by 276 days.

(21) Appl. No.: 18/149,558

(22) Filed: Jan. 3, 2023

(65) Prior Publication Data

US 2023/0156082 A1     May 18, 2023

Related U.S. Application Data

(63) Continuation of application No. 17/392,559, filed on Aug. 3, 2021, now Pat. No. 11,582,301.

(Continued)

(51) Int. Cl.
    *H04L 67/1095*    (2022.01)
    *A63B 71/06*    (2006.01)
    (Continued)

(52) U.S. Cl.
    CPC ...... *H04L 67/1095* (2013.01); *A63B 71/0622* (2013.01); *A63B 71/0669* (2013.01);
    (Continued)

(58) Field of Classification Search
    CPC ... H04L 67/1095; H04L 67/306; H04L 67/55; H04L 67/535; A63B 71/0622;
    (Continued)

(56) References Cited

U.S. PATENT DOCUMENTS 10,452,247 B2 * 10/2019 Stephens ................. H04L 51/56
10,744,413 B2 *  8/2020 Kesack ................... H04W 4/21
(Continued)

FOREIGN PATENT DOCUMENTS

WO    WO-2020210492 A1 * 10/2020 ........... A42B 3/0433

OTHER PUBLICATIONS

Wearable RFID is Changing the Nature of NFL Statistics, retrieved from https://www.arrow.com/en/research-and-events/articles/wearable-rfid-is-changing-the-nature-of-nfl-statistics, dated Nov. 5, 2015, published by Chris McGrady (Year: 2015).*

(Continued)

*Primary Examiner* — Michael A Keller
(74) *Attorney, Agent, or Firm* — SMART & BIGGAR LP

(57) ABSTRACT

System and methods for tracking events in a sports game using one or more event input devices. Each event input device tracks a subset of the game events and the devices work together to provide a simplified input experience by sharing input and context from other event input devices. Since the user is only responsible for capturing a subset of the events, and because each device simplifies the input requirements of the other event input devices, the end user is still able to enjoy watching the game while also opening up the input task to users who would not have typically done so. The combined results of the devices provides a complete picture of the game in the form of a game play-by-play for the fans and statistics for the coaches. Integration with the scoreboard, communication system and player devices provide further event input simplification, rich content for viewers and simplification for traditional scorekeepers and sound controllers.

20 Claims, 12 Drawing Sheets

Related U.S. Application Data

(60) Provisional application No. 62/706,198, filed on Aug. 4, 2020.

(51) Int. Cl.
| | |
|---|---|
| *G06F 3/0482* | (2013.01) |
| *G06F 3/04886* | (2022.01) |
| *H04L 67/306* | (2022.01) |
| *H04L 67/55* | (2022.01) |

(52) U.S. Cl.
CPC ........ *G06F 3/0482* (2013.01); *G06F 3/04886* (2013.01); *H04L 67/306* (2013.01); *H04L 67/55* (2022.05)

(58) Field of Classification Search
CPC ............... A63B 71/0669; G06F 3/0482; G06F 3/04886; G06F 3/04847
See application file for complete search history.

(56) References Cited

U.S. PATENT DOCUMENTS

| | | | | |
|---|---|---|---|---|
| 2018/0054659 | A1* | 2/2018 | Goswami | H04N 13/243 |
| 2018/0256945 | A1* | 9/2018 | Hall | A63B 60/46 |
| 2018/0280811 | A1* | 10/2018 | Martin | A63F 13/828 |
| 2019/0054347 | A1* | 2/2019 | Saigh | A61B 5/103 |
| 2019/0088373 | A1* | 3/2019 | Sarmentero | G16H 40/67 |
| 2019/0388728 | A1* | 12/2019 | Wang | G06F 18/29 |
| 2020/0164247 | A1* | 5/2020 | Kline | A63B 24/0062 |

OTHER PUBLICATIONS

Tackling Tech: The NFL's Next Gen Stats: Today and Tomorrow, retrieved from https://www.patriots.com/news/tackling-tech-the-nfl-s-next-gen-stats-today-and-tomorrow-274096, dated Oct. 5, 2016, by Bob Wallace (Year: 2016).*

Reverse Engineering Swing Mechanics from Statcast Data, retrieved from https://community.fangraphs.com/reverse-engineering-swing-mechanics-from-statcast-data/, dated Sep. 14, 2017, by David Marshall (Year: 2017).*

Douglas (On-Ice Measures of External Load in Relation to Match Outcome in Elite Female Ice Hockey, National Library of Medicine NIH, retrieved from https://pmc.ncbi.nlm.nih.gov/articles/PMC6681036/, Jul. 16, 2019; hereinafter NIH) (Year: 2019).*

Sorensen (Puck and Player Tracking in the NHL: The Basics, retrieved from https://novacapsfans.com/2019/01/25/puck-and-player-tracking-in-the-nhl-the-basics/, Jan. 25, 2019; hereinafter NPL2) https://novacapsfans.com/2019/01/25/puck-and-player-tracking-in-the-nhl-the-basics/ (Year: 2019).*

Wyshynski (Inside the arrival of NHL player tracking, from microchips to megabets, ESPN retrieved from https://www.espn.com/nhl/story/_/id/25872085/inside-arrival-nhl-player-tracking-microchips-megabets, Jan. 29, 2019; hereinafter ESPN) (Year: 2019).*

Baker (Seattle's team must prepare for incoming tidal wave of advanced NHL stats, The Seattle Times, retrieved from https://www.seattletimes.com/sports/hockey/seattles-team-must-prepare-for-incoming-tidal-wave-of-advanced-nhl-stats/, updated Apr. 10, 2019; hereinafter NPL3) (Year: 2019).*

SMT (Four Ways the NHL is Using Technology to Enhance the Fan Experience, retrieved from https://smt.com/four-ways-the-nhl-is-using-technology-to-enhance-the-fan-experience/) (Year: 2024).*

Sorensen (The Emergence of "Big Data" in the NHL: A Practical Example, Mar. 13, 2020, retrieved from https://novacapsfans.com/2020/03/13/the-emergence-of-big-data-in-the-nhl-a-practical-example/; hereinafter NPL1) (Year: 2020).*

* cited by examiner

Game roles selection screen 184

Event Input Screen 180

Event Display Screen 182

Conflict Resolution Screen 188

SYSTEM AND METHODS OF TRACKING PLAYER GAME EVENTS

CROSS-REFERENCE

The present application claims the benefit of U.S. Provisional Patent Application No. 62/706,198 titled System and Methods of Tracking Game Events filed Aug. 4, 2020 and U.S. Non-Provisional patent application Ser. No. 17/392,559 titled System and Methods of Tracking Game Events filed Aug. 3, 2021 the content of which are incorporated herein by reference.

FIELD

The present application generally relates to tracking of events in sports games and, in particular to systems and methods for tracking and simplifying the entry of the events using multiple devices.

BACKGROUND

During sports games (typically minor sports), spectators (typically parents) record game events and statistics during the game. Such events keep parents at home updated with important game information (time, score, etc.). Such statistics are used by coaches after the game to assist in practices and future games. Tracking of statistics has typically been a tedious and stressful task for one person, especially in a fast paced game such as ice hockey, or a very manual process for a group of people. In order to accurately gather a large number of game events in a very short period of time and relay those game events to a large number of fans, spread out around the world in near real time, a system and method is required using multiple devices. It is desirable to automate and simplify the gathering and distribution of statistics and generation of game events.

SUMMARY

A system and method for tracking events in a sports game, using a plurality of network-connected event input devices and a communication network. Event input devices display a game roles selection user interface which includes editable fields to take ownership of game roles and an indication of which users are currently signed up for which roles. Event input devices display an event input user interface that provides editable fields to record game events. The event input devices receive game events and statistics which are sent to the server over the communication network. The server is configured to store and manage the game events and statistics. The server combines the game events and the statistics from the event input devices to create a complete play-by-play of the sports game and statistics for the sports game, group of games, player or group of players. The server sends the game events and statistics to client devices which display a play-by-play user interface of game events and a statistics user interface of the sports game, group of games, player or group of players. The server sends the game events and statistics to one or more event input devices to track the events of the sports game.

An event input device receives game events and statistics from the server that were generated by other event input devices and uses those events to simplify the user interface, automatically populate the user interface fields, highlight the user interface fields, and simplify the event input requirements.

The server receives game events and statistics from a plurality of event input and client devices and detects conflicting or incorrect events, generates a resolution request message, and sends a resolution request message to an event input device over the communication network. The event input device receives the resolution request message, displays a conflict resolution user interface, receives a resolution response event and then sends the resolution response message to the server over the communication network. Finally the server updates and stores the modified game event.

The server may detect conflicting or incorrect events by detecting a threshold number of down votes being received on a game event from a plurality of client or event input devices.

An event input device is a traditional physical scoreboard located in a sports complex, providing game events to the server. The game events provided by the scoreboard may be proxied through another event input device that has a communication channel to the server. An event input device, the server or the server using an event input device as a proxy may control or partially control the scoreboard.

An event input device is a communication system, located in a sports complex, providing game events to the server. The game events provided by the communication system may be proxied through another event input device that has a communication channel to the server. An event input device, the server or the server using an event input device as a proxy may control or partially control the communication system.

An event input device or server may generate media and send it to the communication system to be presented. The media generated may be chosen contextually based on the current status of the game or recent events in the game.

The communication system may provide information in the form of a game event, about the media being presented. The game events provided might be alternative versions of the media being presented that are more suitable for presentation based on the output capabilities of the client devices.

An event input device is a player device providing game events related to a specific player to the server. The game events provided by the player device may be proxied through another event input or client device that has a communication channel to the server.

An event input device, a client device or the server may generate additional game events based on a plurality of events received from the player device or event input devices.

The server generates a notification message based on a plurality of events generated by player devices, and sends the notification message to a client or event input device which displays the notification message.

A subset of player game events are only visible to a subset of client or event input devices.

A system for tracking events in a sports game, comprising a server which receives game events and statistics from a plurality of event input devices over the communication network. The server stores and manages the game events and statistics, combines the game events and statistics to create a play-by-play of the sports game and statistics for the sports game, group of games, player or group of players. The server then sends the game events and statistics to one or more client devices to display a play-by-play user interface of game events and a statistics user interface of the sports game, group of games, player or group of players. The server also sends the game events and statistics to one or more event input devices to track the events of the sports game.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

Figure 1:
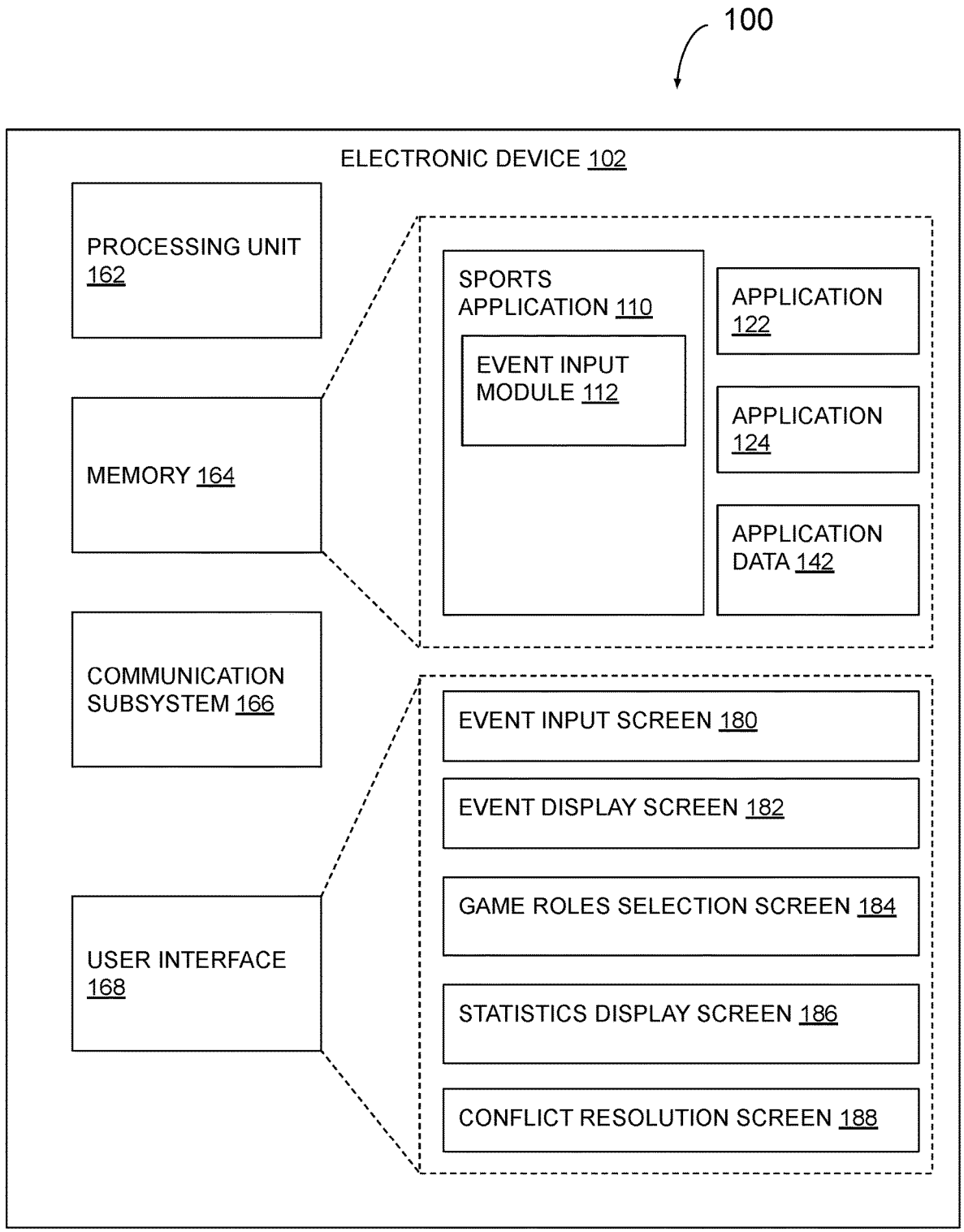
FIG. 1 is a simplified schematic diagram showing an electronic device that tracks and displays game events and statistics, in accordance with an example embodiment of the present application.

In the present application, the term "and/or" is intended to cover all possible combinations and sub-combinations of the listed elements, including any one of the list elements alone, any sub-combinations, or all of the elements, and without necessarily excluding additional elements.

In the present application, the phrase "at least one of . . . or . . . " is intended to cover any one or more of the listed elements, including any one of the listed elements alone, any sub-combinations, or all of the elements, without necessarily excluding any additional elements, and without necessarily requiring all of the elements.

In the present application, the phrase "the team" is intended to refer to a group of people associated with a single sports team. For example a team may include players, parents, grandparents, coaches, sponsors, managers, friends, etc. The team members are primarily concerned with the events that directly affect their team.

In the present application, the phrase "shot(s) for" is intended to refer to a shot(s) taken by the team being managed by the system, and the phrase "shot(s) against" is intended to refer to a shot(s) taken by the opposing team, both used as examples in an ice hockey game, in accordance with an example of the present application.

In the present application, the phrase "split" is intended to refer to a group of games when referring to statistics for a player or team. For example a seasonal split represents all of the games in a season, a win split represents all games the team won in a season, an opponent split is all the games played against a specific opponent, among others.

In the present application, the phrase "sports complex" is intended to refer to any location where a sports game or activity can be played or take place. For example an indoor ice hockey arena, an outdoor ice hockey arena, an indoor floor hockey arena, an outdoor floor hockey arena, a gymnasium, a soccer field, a football field, a track and field stadium, a football stadium, a baseball diamond, a baseball stadium, and swimming pool are all examples of sports complexes. Many other examples or combinations of the above are possible. A sports complex may contain one or more of the above and many contain or host a variety of different sports.

The present application relates to tracking events in sports games using multiple spectators on mobile devices. The sport can include any team or individual sport. The sport can be ice hockey, floor hockey, inline hockey, baseball, soccer, football, rugby, lacrosse, among other examples.

The events (alternatively referred to as "game events") can be any game related event that happens during the game associated with the players, coaches, referees, or spectators. For instance in a hockey game, an event can be a faceoff, a shot, a goal, a penalty, a stoppage of play, time change, period change, song being played in the arena, a video clip of the game, among other examples. In another example, in a baseball game an event can be a pitch, foul ball, strike, stolen base, inning change, among other examples. A game event can also be an event that is specific to a player, for example, in an ice hockey game a game event can be a heart rate, motion information (in motion or stationary), on-ice status (on the ice or on the bench), location on the rink, time on the ice, among other examples.

Mobile devices may include smartphones, tablets, laptops, portable computers, wearable computing devices (e.g. smart watch, smart glasses, wearable activity monitor, or the like), scoreboard, communication system, or any other type of computing device that may have a communication module for communicating with another computing device.

FIG. 1 is a schematic diagram 100 showing an electronic device 102 that tracks and displays game events and statistics, according to an implementation. The electronic device 102 includes a processing unit 162, a communication subsystem 166, a user interface 168, and memory 164. An electronic device may include additional, different, or fewer features, as appropriate.

The example processing unit 162 can include one or more processing components (alternatively referred to as "processors" or "central processing units" (CPUs)) configured to execute instructions related to one or more of these processes, steps, or actions described above, in connection with one or more of the implementations disclosed herein. In some implementations, the processing unit 162 can be configured to generate control information, such as measurement report, or respond to received information, such as control information from a network node. The processing unit 162 can also include other auxiliary components, such as random access memory (RAM) and read-only memory (ROM).

The example communication subsystem 166 can be configured to provide wireless or wireline communications for data or control information provided by the processing unit 162. The communication subsystem 166 can include, for example, one or more antennas, a receiver, a transmitter, a local oscillator, a mixer, and a digital signal processing (DSP) unit. In some implementations, the communication subsystem 166 can support multiple input multiple output (MIMO) transmissions. In some implementations, the receivers in the communication subsystem 166 can be an advanced receiver or a baseline receiver. Two receivers can be implemented with identical, similar, or different receiver processing algorithms.

The example user interface 168 can include, for example, any of the following: one or more of a display or touch screen display (for example, a liquid crystal display (LCD), a light emitting diode (LED), an organic light emitting diode (OLED), or a micro-electromechanical system (MEMS) display), a keyboard or keypad, a trackball, a speaker, or a microphone. The user interface may also include externally hosted devices such as a smart watch, smart glasses, augmented reality device, virtual reality device or other such devices that can provide input or output. As shown in FIG. 1, the example user interface 168 can output an event input screen 180, an event display screen 182, a game roles selection screen 184, a statistics display screen 186, or a conflict resolution screen 188. The event input screen 180 is a user interface object that receives sports game related input events from a user or other device. The event display screen 182 is a user interface object that displays sport game related events. The game roles selection screen 184 is a user interface object that allows the user to choose an event input role(s) for which the user wishes to enter related event input data. The statistics display screen 186 is a user interface object that displays sport game related statistics for a game, a split, for the players, group of players or the team. The conflict resolution screen 188 is a user interface object that assists in resolving conflicts or inaccuracies in game events. The event inputs can be received from a physical or virtual keyboard, a touch screen, a voice recognition processor, another user interface component, another event input device, a server, a microphone, a sensor, or an external device. FIGS. 3-7, 10 and associated descriptions provide additional details of these implementations. The user interface 168 can also include I/O interface, for example, a universal serial bus (USB) interface.

The example memory 164 can be computer-readable storage medium on the electronic device 102. Examples of the memory 164 include volatile and non-volatile memory, magnetic media, optical media, random access memory (RAM), read-only memory (ROM), removable media, and others. The memory 164 can store an operating system (OS) of the electronic device 102 and various other computer-executable software programs for performing one or more of the processes, steps, or actions described above. The memory 164 can store applications, data, operating system, and extensions for the electronic device 102. As illustrated, the memory 164 stores applications 122 and 124, data 142, and a sports application 110.

Applications, e.g., the applications 122, 124 and 110 can include programs, modules, scripts, processes, or other objects that can execute, change, delete, generate, or process application data. For example, applications can be implemented as Android, iOS, web or Enterprise Java Beans (EJBs). Design-time components may have the ability to generate run-time implementations into different platforms, such as J2EE (Java 2 Platform, Enterprise Edition), ABAP (Advanced Business Applications Programming) objects, ANDROID, iOS, or Microsofts's .NET. Further, while illustrated as internal to the electronic device 102, one or more processes associated with an application may be stored, referenced, or executed remotely. For example, a portion of an application may be an interface to a web service that is remotely executed. Moreover, an application may be a child or sub-module of another software module (not illustrated).

Application data 142 can include various types of data, e.g., files, classes, frameworks, backup data, business objects, jobs, web pages, web page templates, database tables, repositories storing business or dynamic information, and other information including parameters, variables, algorithms, instructions, rules, constraints, or references thereto. The application data 142 may include information that is associated with an application, a network, a user, and other information. For example, the data 142 may include data associated with applications 122, 124 and 110. In some cases, data associated with different applications can be stored in different portions of the memory 164. For example, data associated with the application 122 may be stored in trustzone. FIGS. 2-12 and associated descriptions provide additional details of these implementations.

The sports application 110 represents an application, set of applications, software, software modules, hardware, or any combinations thereof, that can be configured to track and display game events and statistics.

The sports application 110 includes an event input module 112. The event input module 112 represents an application, set of applications, software, software modules, hardware, or any other combination thereof, that can be configured to receive event input parameters from the user, combine with input parameters from other devices and sensors, and generate game events and statistics. FIGS. 2-12 and associated descriptions provide additional details of these implementations and other example operations.

Turning to a general description, an electronic device, e.g., the electronic device 102, may include, without limitation, any of the following: computing device, mobile device, mobile electronic device, user device, endpoint Internet of Things (IoT) device, Enterprise of Things (EoT) device, mobile station, subscriber station, portable electronic device, mobile communications device, wireless modem, wireless terminal, television, desktop computer, scoreboard, sound system, communication system, printer, or other peripheral, vehicle, smart glasses, smart watch, virtual reality or augmented reality devices, or any other electronic device capable of sending and receiving data. Examples of mobile device may include, without limitation, a cellular phone, a personal data assistant (PDA), smart phone, laptop, tablet, personal computer (PC), pager, portable computer, portable gaming device, wearable electronic device, smart glasses, health/medial/fitness device, camera, scoreboard, sound system, communication system, or other mobile communications devices having components for communicating voice or data via a wireless communication network. The wireless communication network may include a wireless link over at least one of a licensed spectrum and an unlicensed spectrum. The term "mobile device" can also refer to any hardware or software component that can terminate a communication session for a user. In addition, the terms "user equipment," "UE," "user equipment device," "user agent," "UA," "user device," and "mobile device" can be used synonymously herein.

While elements of FIG. 1 are shown as including various component parts, portions, or modules that implement the various features and functionality, nevertheless, these elements may instead include a number of sub-modules, third-party services, components, libraries, and such, as appropriate. Furthermore, the features and functionality of various components can be combined into fewer components, as appropriate.

Figure 2:
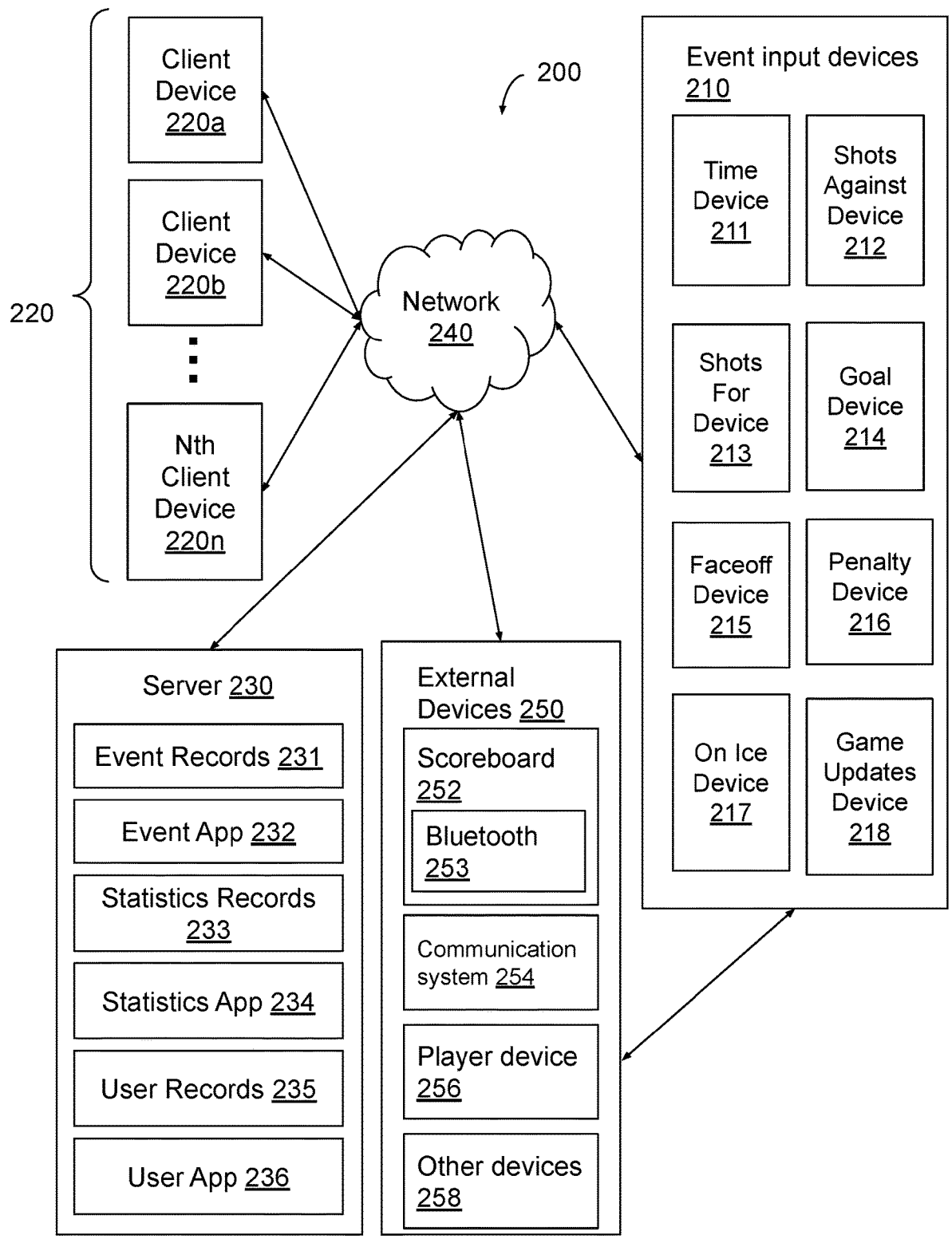
FIG. 2 is a simplified block diagram illustrating an example system for tracking game events and statistics using multiple devices in accordance with an example embodiment of the present application.

FIG. 2 illustrates, in block diagram form, a system 200 for tracking sport game events using multiple devices to simplify data entry and display game events and statistics, in accordance with an example of the present application.

The system 200 may include a plurality of event input devices 210 (illustrated individually as 211-218). In some examples, the system 200 may include a server 230, zero or more client devices 220 (illustrated individually as 220a-220n) and zero or more external devices 250 (illustrated individually as 252-258). The system 200 may include a network 240.

Each respective event input device 210 may be responsible for capturing one or more types of events. In some examples, the event input devices 210 may transmit the events to the server 230 for storage, further processing and to communicate out to client devices 220 and other event input devices 210.

The server 230 may be a single server, multiple servers, a server farm, or any other such arrangement of computing devices to implement a computing server-like functionality. The server 230 includes one or more processors, memory, and a communication module for providing communications capability with other computing devices, such as event input devices 210, client devices 220 or external devices 250. The server includes processor executable instructions stored in memory that, when executed, causes incoming game events and statistics to be stored, processed and distributed to other event input devices 210 and client devices 220. In some examples the server 230 could be a Google Firebase server, an Amazon Web Service (AWS) server or Microsoft Azure server.

The server 230 may include zero or more event records 231. An event record may be a data structure for storing data relating to a game event. In some examples, the event record 231 may include a date/timestamp associated with the creation date of the record and a user identifier or user name associated with the user that created the record. In some examples, the event record 231 contains one or more player names or player identifiers associated with the players involved in the event. In some examples, the event record 231 contains a result such as a win or loss or an event type to distinguish that type of event. For example in an ice hockey game, a faceoff event could include information corresponding to the player name and identifier who took the faceoff, the location of the faceoff (offensive zone, defensive zone, neutral zone, etc.), and if the player won or lost the faceoff.

The server may include an event application 232 which listens for data changes to the event records 231 and sends notifications to users when important events occur, generates additional events, removes or combines duplicate events, or removes, updates or flags inappropriate comments added by team members. For example, for a shot marked as a goal, if no user is monitoring goals, the event app will automatically generate a goal event and statistics for the shot event. In another example the event application 232 might automatically generate information about the current opponent, such as the result of the last game played against that opponent or strengths or weaknesses of that opponent. In another example if one user is monitoring shots and another user is monitoring goals, a shot marked as a goal and a goal event are redundant and one can be removed automatically by the event app 232.

The server 230 may include zero or more statistical records 233. A statistics record may be a data structure for storing statistics data for a player, group of players, game, a split or a team. In some examples, the statistics record 233 may include a player identifier, a team identifier, a game identifier, the type of statistic, a value, or other statistic related data.

The server 230 may include a statistics application 234 which listens for data changes to the statistical records 233 and resolves conflicts in the data (resulting from duplicate reports from multiple event input devices 210), generates new statistics, or updates existing statistics. In one embodiment, after a game is finished, the statistics application 234 generates cumulative statistics records which represent statistics for a player, game, split, or team. For example, a cumulative statistics record could be a season total for goals for a player, a win/loss total against a specific team for the season, a faceoff percentage for a player for at home games, or many other cumulative statistics.

The server 230 may include zero or more user records 235. In some examples, the server 230 may store a user record 235 for each registered user in the system. The user record 235 may include the users name, email, phone number, notification tokens and role within the team. A role defines what the user can do within the system. In some examples, the roles include player, coach, statistician, parent, manager, sponsor, administrator or friend.

The server 230 may include a user application 236 for managing users access to data. For example a team member must only have access to teams which they belong to and a parent may only have access to their child's data.

In another embodiment, one of the event input devices 210 being used in the game to track events or client devices 220, acts as a server agent, providing the functions of the server 230. For example, it is contemplated that a sports application 110 (FIG. 1) may be downloaded by the devices 210, 220 to act as the server, client or both.

The system 200 may include one or more event input devices 210 coupled to the network 240. An event input device 210 includes one or more processors, memory, and a communication module for providing communication capability with other computing devices. The event input device 210 may be a personal computer, a smartphone, a tablet, a scoreboard, or any other computing device that may be configured to store data and software instructions and execute software instructions. FIG. 1 and associated descriptions provide additional details of these implementations.

An event input device 210 is a device that provides the ability to input game related events. For example in an ice hockey game a game event is a faceoff, goal, penalty, shot, etc. In order to simplify the process of entering game events, different devices/users can sign up to be responsible for entering a subset of the game events.

In the provided example embodiment, the total event input for a game is divided into 8 different game roles which are represented by the 8 event input devices 211-218. The event input devices 210 may be a time device 211, a shots against device 212, a shots for device 213, a goal device 214, a faceoff device 215, a penalty device 216, an on ice device 217, or a game updates device 218. Other embodiments may use a different distribution of the game events into the same number, fewer or more game roles (event input devices) or use different names for those roles or devices.

In another embodiment, shots for and shots against are incorporated into the same role. In another embodiment, goals and penalties are incorporated into the same role. It should be understood that any number of groupings of events are possible and the groupings provided are for illustration purposes only for an ice hockey game. Groupings for other sports would be different.

Figure 3:
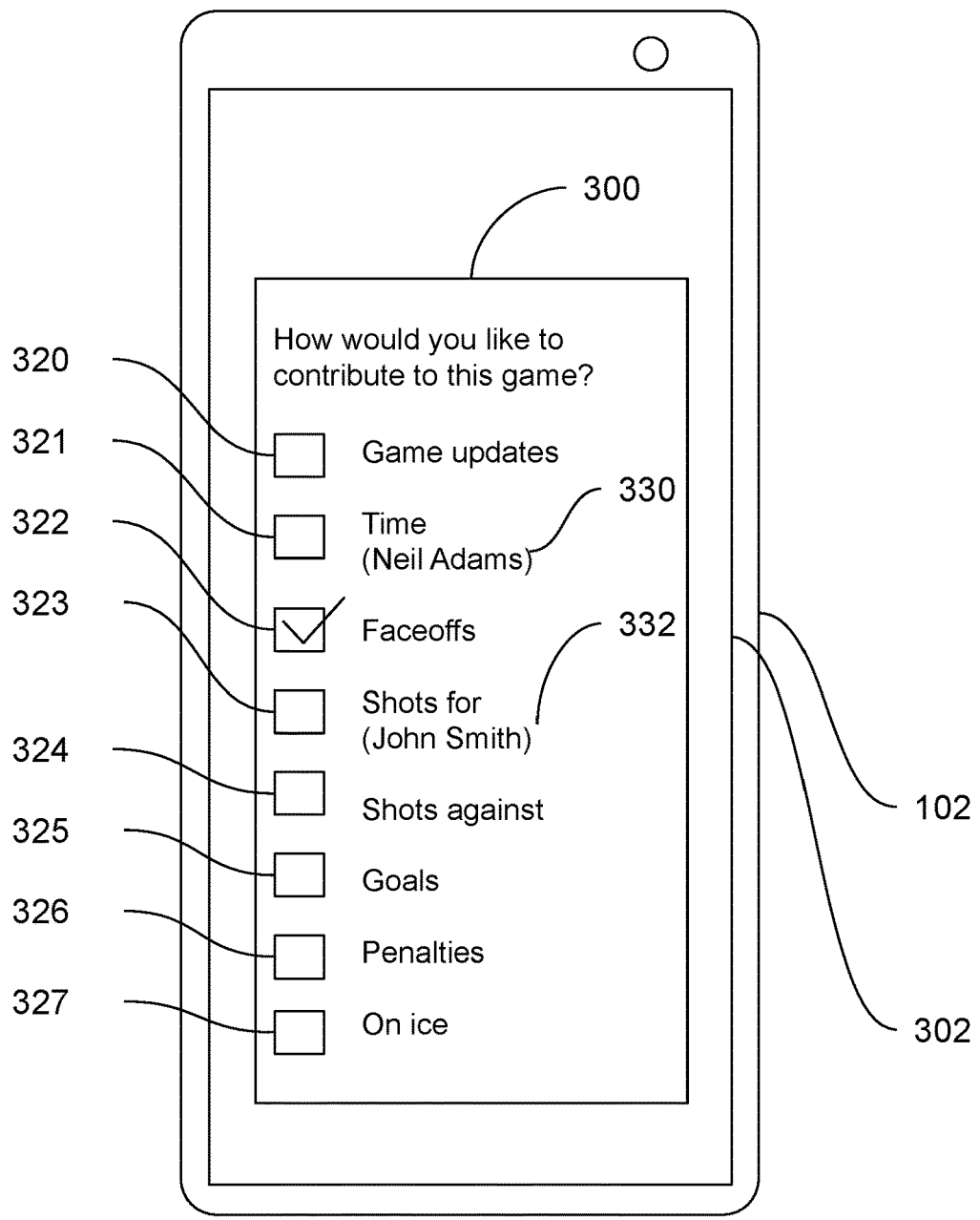
FIG. 3 is an illustration of the front view of an example electronic device displaying the data entry fields allowing the user to choose an event entry role for an ice hockey game, in accordance with an example embodiment of the present application.

The number of users and event input devices 210 used to track game events may vary from game to game. For example in one game there may be a different user for each event input type (time, shots against, shots for, goals, faceoffs, penalties, on ice players, or game updates). In another example, one user may take on several roles (time, shots against, shots for) while the rest of the events are each handled independently by separate users. In another example one user may take on all roles alone. FIG. 3 and associated descriptions provide additional details of these example roles for the event input devices 210. It may be understood that the system 200 may include any number of event input devices 210 each capturing one or more types of game events.

The system 200 may include one or more client devices 220 coupled to the network 240. A client device 220 includes one or more processors, memory, and a communication module for providing communication capability with other computing devices. A client device 220 may be a personal computer, a smartphone, a tablet or any other computing device that may be configured to store data and software instructions and execute software instructions. FIG. 1 and associated descriptions provide additional details of these implementations.

A client device 220 can view a play-by-play of a game events that were generated by the event input devices 210 and external devices 250, may view statistics for a game, a split, a player, a team, may view or edit a list of users on the team, may view or edit a list of games associated with the team, may view or edit a list of teams associated with the user, may view or edit a list of players associated with the team, may view or edit a list of opponents, or may view or edit a list of segments associated with the team. The features described above may be limited based on the user's role on the team. The features above may be partially or fully implemented or supported by a server 230.

The system 200 includes a communication network 240 that enables a plurality of event input devices 210, a plurality of client devices 220, a server 230 and a plurality of external devices 250 to exchange data. The network 240 may be any type of network capable of enabling a plurality of communication devices to exchange data such as, for example, a local area network (LAN), such as a wireless local area network (WLAN) such as Wi-Fi™, a wireless personal area network (WPAN), such as Bluetooth™ based WPAN, a wide area network (WAN), a public-switched telephone network (PSTN), or a public-land mobile network (PLMN), which is also referred to as a wireless wide area network (WWAN) or a cellular network. The network 240 may comprise a plurality of the aforementioned network types coupled via appropriate methods known in the art.

While FIG. 2 illustrates client devices 220 and event input devices 210 as being separate components for illustration purposes, these components would typically be integrated into a single component and the role of the user within the team and/or game would determine if the device is acting as a client device 220, which is primarily a consumer of game data, or an event input device 210, which is primarily a producer of game data, or both a client device 220 and an event input device 210. The features and functionality of the event input devices 210 and client devices 220 can be combined into fewer components or separated into more components as appropriate.

The system 200 includes zero or more external devices 250, which are devices capable of capturing or receiving game related events but may not conform exactly to that of an electronic device 102 as described in FIG. 1. For example an external device 250 might include a scoreboard 252, which refers to a physical scoreboard display and control module. In another example an external device includes a motion sensor, a heart rate sensor, a shock sensor, a sound system, a communication system, a player device, a camera, a Bluetooth™ sensor or any other device having the ability to capture or receive game events. In an embodiment an external device 250 is an event input device 210.

The system 200 may include zero or more traditional game scoreboards 252 physically located in the sports complex. The scoreboard 252 may include a handheld control, a master control, an indoor scoreboard display, an outdoor scoreboard display or a video display scoreboard, among others.

In one embodiment the scoreboard 252 acts as an event input device 210 providing game events. For example, in an ice hockey game, a scoreboard 252 could provide the current score, the time of the game, the current period, the penalties (player numbers, length of penalties, time left on penalties), the goals (player who scored, time of goal, players who assisted), or the number of shots on net (for or against).

In one embodiment the scoreboard 252 has a communication subsystem that allows communication with the server 230 over the network 240 to send or receive game events that can be stored as event records 231 or statistical records 233. The communication subsystem may use cellular, Wi-Fi™, Bluetooth™, Bluetooth™ Low Energy, NFC (near-field communication), or any other wired or wireless modes of communication.

In another embodiment the scoreboard 252 communicates indirectly with the server 230 using an event input device 210 as a proxy for the events being generated by the scoreboard 252. For example the scoreboard 252 may communicate with an event input device 210 using a built-in or externally connected Bluetooth™ module 253. The scoreboard 252 may send a game event from the scoreboard 252 to the event input device 210 using Bluetooth™, which will then be sent to the server 230 via the network 240. The scoreboard may use cellular, Wi-Fi™, Bluetooth™' Bluetooth™ Low Energy, NFC (near-field communication), or any other wired or wireless modes of communication to communicate with the event input device 210. In another embodiment the event input device 210 may alter the game event before sending it to the server. In another embodiment the event input device 210 may combine the game event from the scoreboard 252 with a game event generated by the event input device 210 before sending it to the server.

In another embodiment the scoreboard 252 may broadcast game events using a Bluetooth™ low energy beacon. Any event input device 210 or client device 220 may receive the game events and proxy the events to the server 230 via the network 240.

In another embodiment an event input device 210 or client device 220 may display the game events received from the scoreboard 252 directly in the event display screen 182 or statistics display screen 186.

In another embodiment an event input device 210 uses zero or more event parameters from the scoreboard 252 in order to simplify event data entry or simplify the user interface when inputting or generating events. For example, in an ice hockey game, when entering a goal using a goal event input device 214, the scoreboard 252 may provide the period, time of goal and player who scored the goal. Referencing FIG. 4, the time of goal 430 and period 432 in the event input screen 180 may be populated with the time and period received from the scoreboard 252. The player who scored may be highlighted in the player selection control 460 with the player who scored that was received from the scoreboard 252. In another example, when entering a penalty using a penalty input device 216, the scoreboard 252 may provide the period, time of penalty, the length of the penalty and player number of the offender. In another example the scoreboard 252 may provide the shots for and shots against.

In another embodiment the scoreboard 252 is controlled or partially controlled from an event input device 210, a server 230, or server 230 using the event input device 210 as a proxy. For example the score shown on the scoreboard 252 may be updated by a goal input device 214. In another example the shots for/against on the scoreboard 252 may be updated by a shots for event input device 213 or a shots against event input device 212.

In the present application, the phrase "an external scoreboard acting as an event input device" is intended to refer to the above embodiments regarding how the scoreboard 252 communicates events to and from the system 200, the event input device 210, the client devices 220 and the server 230.

The system 200 may include zero or more traditional communication systems 254 located in the sports complex. The communication system 254 may include speakers, microphones, amplifiers, mixers, processors, CD players, portable music players, MP3 players, video displays, lights and lighting systems, smoke and smoke systems, fireworks, pyrotechnics, projection systems or other such devices.

The main role of a communication system 254 is to present media to attendees (players, staff, fans, officials, coaches, etc.) of a sports game. Media includes audio, video, lights, smoke, fireworks, pyrotechnics, projections, or any other methods used to communicate with or excite attendees.

In one embodiment the communication system 254 has a communication subsystem that allows communication with the server 230 over the network 240 to send or receive game events that can be stored as event records 231 or statistical records 233. The communication subsystem may use cellular, Wi-Fi™, Bluetooth™, Bluetooth™ Low Energy, NFC (near-field communication), or any other wired or wireless modes of communication.

In another embodiment the communication system 254 communicates indirectly with the server 230 using an event input device 210 as a proxy for the events being generated by the communication system 254. For example the communication system 254 may communicate with an event input device 210 using a built-in or externally connected Bluetooth™ module. The communication system 254 may send a game event from the communication system 254 to the event input device 210 using Bluetooth™, which will then be sent to the server 230 via the network 240. The communication system 254 may use cellular, Wi-Fi™, Bluetooth™, Bluetooth™ Low Energy, NFC (near-field communication), or any other wired or wireless modes of communication to communicate with the event input device 210. In another embodiment the event input device 210 may alter the game event before sending it to the server 230. In another embodiment the event input device 210 may combine the game event from the communication system 254 with a game event generated by the event input device 210 before sending it to the server 230.

In another embodiment the communication system 254 may broadcast game events using a Bluetooth™ low energy beacon. Any event input device 210 or client device 220 may receive the game events and proxy the events to the server 230 via the network 240.

Figure 6:
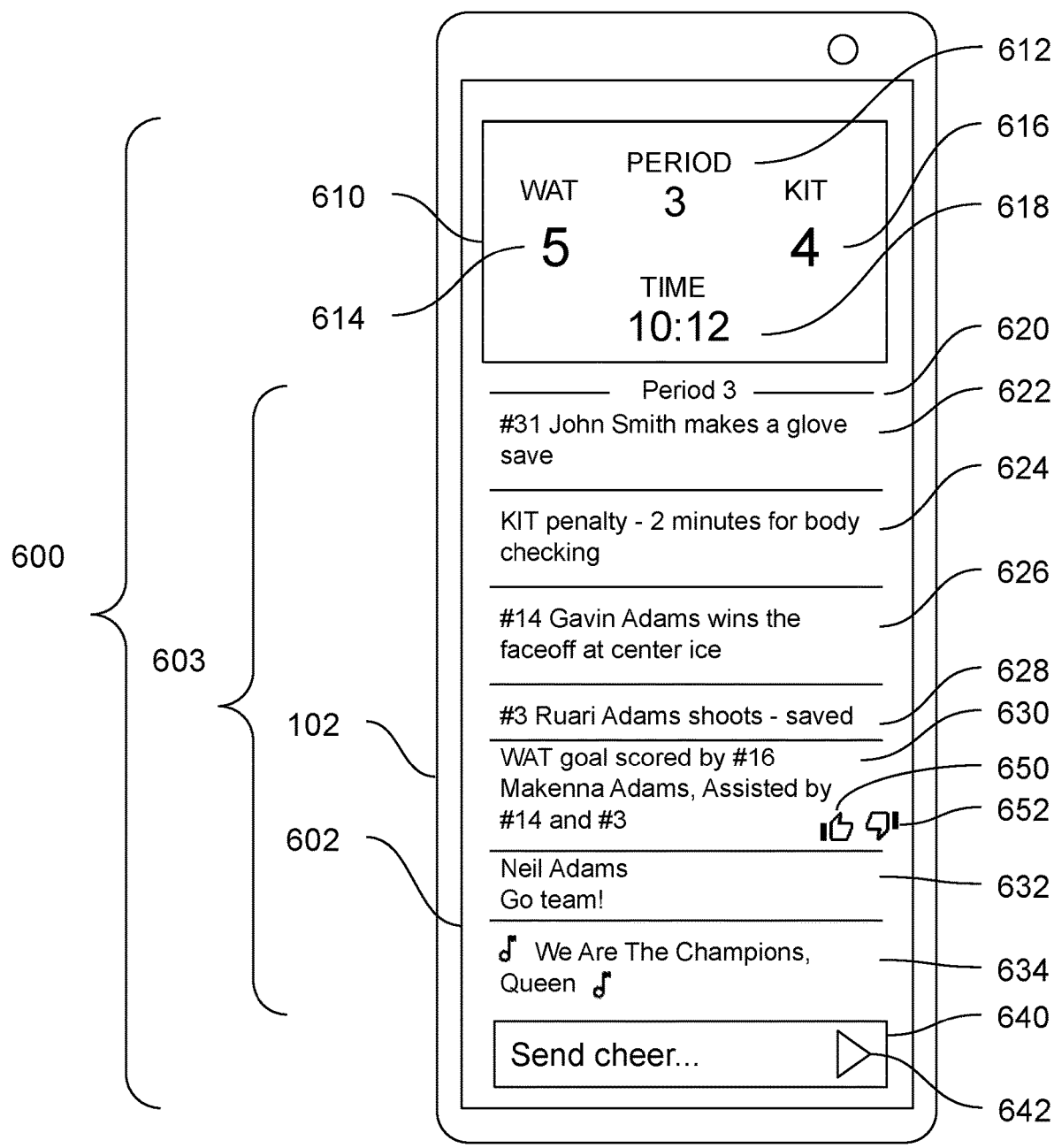
FIG. 6 is an illustration of the front view of an example electronic device displaying game events on client devices that were generated by event input devices, in an ice hockey game, in accordance with an example embodiment of the present application.
Figure 7:
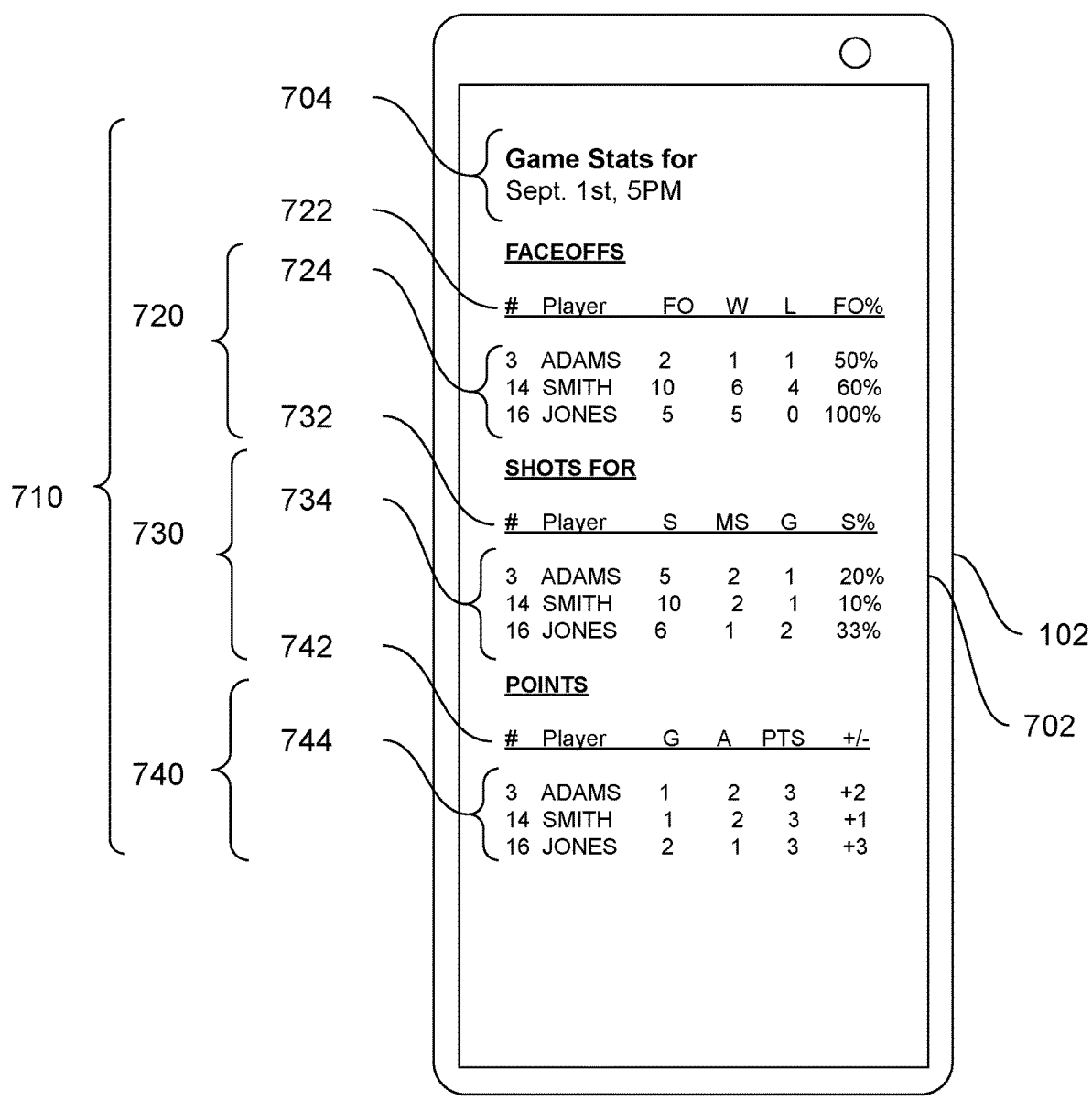
FIG. 7 is an illustration of the front view of an example electronic device displaying statistics for a single game that was generated by event input devices, in an ice hockey game, in accordance with an example embodiment of the present application.

In another embodiment an event input device 210 or client device 220 may display the game events received from the communication system 254 directly in the event display screen 182 (FIG. 6) or statistics display screen 186 (FIG. 7).

In one embodiment an event input devices 210 or server 230 communicate with the communication system 254 to play audio, video or any other output media supported by the communication system 254. For example, in an ice hockey game, when the user of a time input device 211 enters a stoppage of play, a song segment is manually or automatically played via a Bluetooth connection to the communication system 254 until the user restarts the game timer (when the play resumes).

In another embodiment media is generated by an event input device 210 or server 230 and sent to the communication system 254 to present. For example an audio or video clip is created by an event input device 210 listing the team players, the starting lineup, a player of the game, goal information (time of goal, who scored, who assisted), penalty information (time of penalty, length of penalty, player numbers) or other game related events and sent to the communication system 254 to play. In another embodiment a text to speech algorithm is used to generate audio played. In another embodiment a video is automatically generated that contains the announcement.

In another embodiment the media is chosen contextually based on the current status of the game or recent events in the game. For example, in a "close game" (the score is close—for example 4-5) and the home team scores, the music played can be an uplifting song, whereas if the score is 10-0 for the home team a more mellow song, or no song at all maybe played. In another example, the music played might differ if the song being played is directly following a goal versus directly following a penalty or injury.

In another embodiment the communication system 254 communicates with an event input device 210, client device 220 or server 230 providing information about the media being presented. For example if music is being played, the communication system would provide the name of the song, the artist, or the audio of the song. The event input device 210, client device 220 or server 230 can then store the song information as an event record 231. In another example if a video is being played, the sound system may provide the video content, a link to the video, the name or description of the video, the length of the video or any other possible information about the video being shown.

In another embodiment an alternate output may be provided by the communication system 254. For example, when the communication output can not be accurately presented on a client device 220 or an event input device 210. For example, if a light, firework or smoke presentation is being done in the arena by the communication system 254 at a sports complex, the communication system 254 may provide a digital representation or alternative in the form of audio, video, or animation as a game event which are more suitable presentation methods based on the output capabilities of the client devices.

In another embodiment an event input device 210 periodically takes audio samples from the device's microphone and uses an algorithm to determine the name and artist of the song being played and then saves them as an event record 231. In another embodiment an event input device 210 periodically takes audio and/or video samples using the device's microphone or camera and stores the samples as event records 231.

In another embodiment an event input device 210 listens for notifications from a system service that broadcasts songs being played (for example the Android "Now Playing" feature) and stores the song information as an event records 231.

In the above embodiments, the saved event records 231, are propagated out to the client devices 220 allowing users not at the game to see and hear similar music or sights that are being experienced by fans physically present at the game.

The system 200 may include zero or more player devices 256. A player device may be any device that can monitor the behaviour of a player while in a game. A player device may include a fitness tracker, smart watch, smart glasses, motion sensor, a heart rate sensor, blood pressure sensor, a shock sensor, an ultrasonic sensor, a camera, a vibration sensor, GPS, or any other device having the ability to capture or receive game events from a player. Examples of player devices 256 include, but are not limited to Fitbit, Apple Watch, Google Watch among others.

In one embodiment the player device 256 has a communication subsystem that allows communication with the server 230 over the network 240 to send or receive game events that can be stored as event records 231 or statistical records 233. The communication subsystem may use cellular, Wi-Fi™, Bluetooth™, Bluetooth™ Low Energy, NFC (near-field communication), or any other wired or wireless modes of communication.

Each player device 256 may detect game events that are specific to that player. For example, in an ice hockey game a player device 256 might detect and report game events including if a player is in motion, the heart rate of the player, the speed the player is moving, the maximum speed of the player in the game, the average speed of the player in the game, the distance travelled in the game, how long a player was on the ice and the location of the player on the ice, among others.

In another embodiment the player device 256 communicates indirectly with the server 230 using an event input device 210 or client device 220 as a proxy for the events being generated by the player device 256. For example the player device 256 may communicate with an event input device 210 using a built-in or externally connected Bluetooth™ module. The player device 256 may use cellular, Wi-Fi™ Bluetooth™, Bluetooth™ Low Energy, NFC (near-field communication), or any other wired or wireless modes of communication to communicate with the event input device 210 or client device 220. For example, the player device 256 may send a game event to the event input device 210 using Bluetooth™, which will then be sent to the server 230 via the network 240. In another embodiment the event input device 210 may alter the game event before sending it to the server 230. In another embodiment the event input device 210 may combine the game event from the player device 256 with a game event generated by the event input device 210 before sending it to the server 230.

Some of the game events reported by the player device 256 may be reported by the players' device 256 directly, some maybe calculated (or generated) by an event input device 210 or client device 220 based a set of game events reported by a player device 256, some may be calculated by the server 230 based on a set of game events reported by a player device 256 or as a combination of the above or by other means. For example, in an ice hockey game, a player device 256 may directly report a players on ice status based on movement or heart rate and report the on ice status directly to the server 230, or to an event input device 210. In another example, in an ice hockey game, the player device 256 may simply report the player's heart rate at 10 second intervals to an event input device 210 which receives a constant stream of heart rates from the players' device. When the event input device 210 detects an increase in heart rate, it generates and sends a game event to the server 230 indicating the corresponding player is now on the ice. When the event input device 210 detects an decrease in heart rate, the event input device 210 generates and sends a game event to the server 230 indicating the corresponding player is now on the bench. The server 230 can use the input from the plurality of event input devices 210 or client devices 220 to determine which players are on the ice at any given time and how long players have been on the ice for this shift or this game. Now referring to FIG. 4, if a goal is scored, the goal event input device 214 can use the on ice players determined by the server 230 to populate the on ice players field 450 or highlight the players in the player selection control 460, making the input of on ice players 450, scored by player 440 and assisted by players 442 easier.

In another embodiment the server 230 may generate a notification to be sent to a team member's device based on an analysis of a plurality of game events received from a player device 256. For example if a player has a heart rate outside of a normal range and has been in the game for a long period of time the server 230 might generate a warning notification to be delivered via a network 240 to the team trainers client device 220.

In another embodiment, the server 230, a client device 220, an event input device 210 or combination of, may use game events reported by player devices 256 to determine if other game events have occurred. For example, in an ice hockey game, the player who scored a goal can be detected based on the players heart rate, the location of the players and the direction of movement of the players shortly after a goal has been recorded by an event input device 210. For example, after a goal is scored the on ice players will typically all move toward the player who scored the goal to congratulate that player and the player who scored the goal might have a higher increase in heart rate compared to the other players.

In another embodiment, game events are generated by a server 230 using a machine learning model using the game events received from a plurality of player devices 256, and event input devices 210 and client devices 220.

In another embodiment the player devices 256 may be securely connected to a client device 220 or event input device 210. For example a child's player device 256 may be only connected to a parent's client device 220 or parent's event input device 210 in order to maintain the privacy of that player's data. In another embodiment the client device 220 or event input device 210 may restrict access to some of the events reported by the player device 256 while making other game events available to all client devices 220, event input devices 210 or the server 230. For example, in an ice hockey game, a client device 220 may receive a stream of heart rates from a player device 256 and may restrict access to the current, min and max heart rate while making the on ice status and time on ice available to other client devices 220 or event input devices 210. In another embodiment the server 230 may determine which game events from player devices 256 should be restricted based on a set of rules. For example the team administrator may specify a rule that all heart rates are only available to the individual players or the parents of those players. In another example the team administrator may specify a rule that all heart rates are only available to the coaches and trainer. Many possible combinations of rules are possible.

In another embodiment one or more player devices 256 may be coupled with a one or more secondary devices, or other devices 258 in the arena. For example, in an ice hockey game, each player may have a digital chip on their helmet and there may be one or more receptor devices positioned around the arena. The digital chip located on the player may communicate with the receptor devices, along with the accompanying system and may provide game events and statistics as an external device 250 including player position, speed, time on ice, positioning on ice among other player and team statistics. Similar to other external devices 250, like the scoreboard 252, the communication system 254 and the player devices 256, the receptor devices system could provide game events either directly to the server 230 via the network 240, or indirectly through the event input devices 210.

FIG. 3 illustrates an example user interface displaying the data entry fields allowing the user to choose an event entry role for an ice hockey game, in accordance with an example of the present application. In the illustrated example, a sports application 110 is executing on the electronic device 102.

As illustrated, an example user interface 300 of the sports application 110 is displayed on a screen 302 of the electronic device 102.

The example user interface 300 includes fields 320-327 that are outputted by the sports application 110.

In the illustrated example, the field 320 is used to assign the event input device ownership over the role of game updates, when selected or checked. In this example the game update role allows the user to enter free form commentary on the game by way of text, pictures, video or other means. It will be apparent to one skilled in the art that more, less or different events may also be included in this role.

In the illustrated example, the field 321 is used to assign the event input device ownership over the role of time entry, when selected or checked. In this example the time role allows the user to set the period, the score, the current game time, start and stop a running game timer, enter stoppages of play (for example icings and offsides) and finish the game. It will be apparent to one skilled in the art that more, less or different events may also be included in this role.

In the illustrated example, the editable field 322 is used to assign the event input device ownership over the role of faceoff data entry, when selected or checked. In this example the faceoff role allows the user to select the location of a faceoff (faceoff circle in the neutral zone, offensive zone, defensive zone, etc.), select the team's player and opponent team's player who are taking the faceoff, enter the result of the faceoff (win or loss) as well as which team won possession of the puck. The checkbox for the role 322 is checked indicating the current user is taking ownership over the faceoff role for this game. It will be apparent to one skilled in the art that more, less or different events may also be included in this role.

Figure 5:
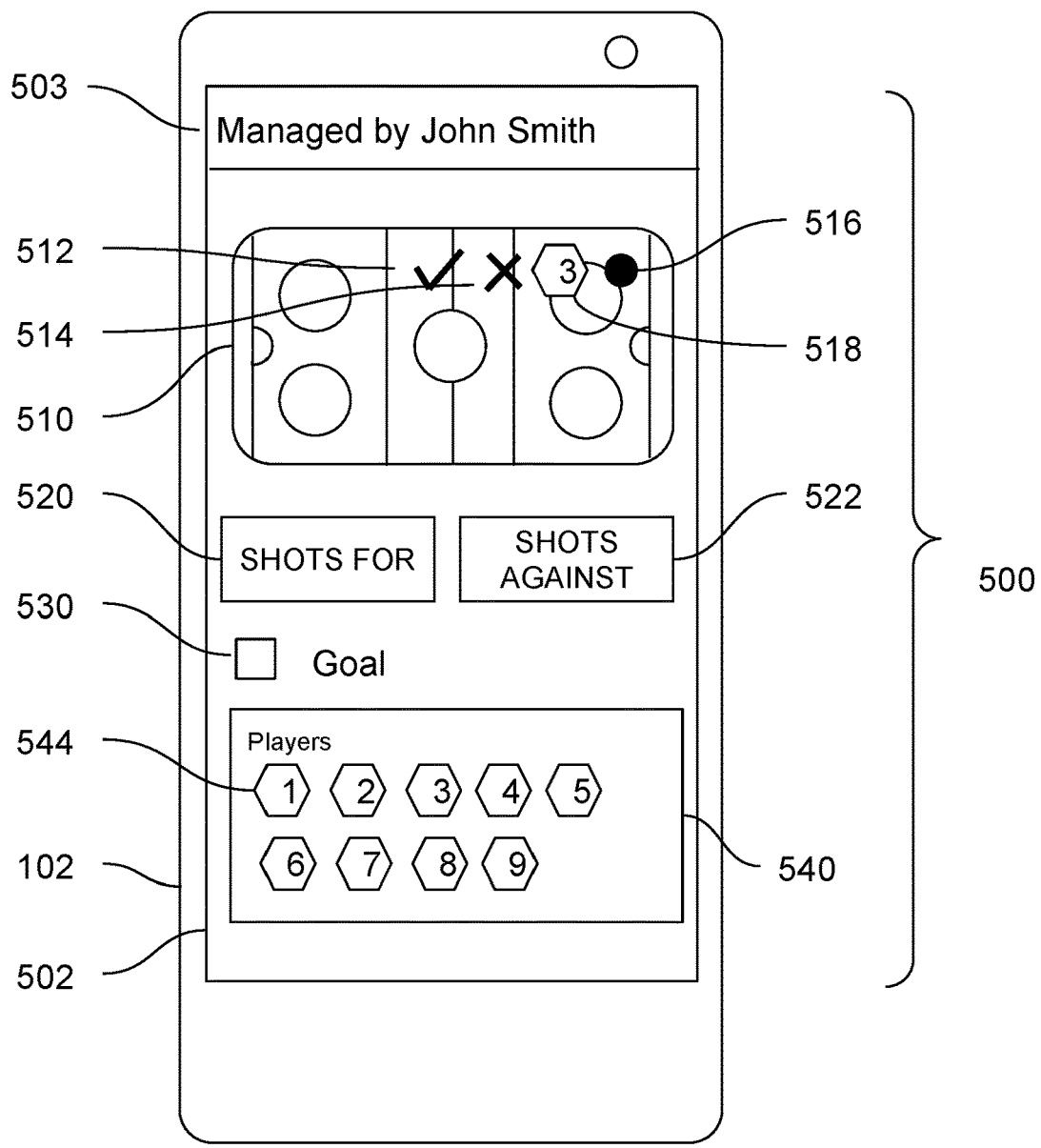
FIG. 5 is an illustration of the front view of an example electronic device displaying the data entry fields when a shot is taken in an ice hockey game, in accordance with an example embodiment of the present application.

In the illustrated example, the editable field 323 is used to assign the event input device ownership over the role of shots for data entry, when selected or checked. In this example the shots for role allows the user to select the location of a shot, select the player who took the shot, if the shot was on net or missed, if the shot was on net how the goalie stopped the puck (blocker, trapper, pads, etc.), if the shot was missed how it was missed (blocked, wide, high, etc.), if the shot resulted in a goal, and if the shot was a goal where in the net the goal was scored. It will be apparent to one skilled in the art that more, less or different events may also be included in this role. FIG. 5 and associated descriptions provide additional details.

In the illustrated example, the editable field 324 is used to assign the event input device ownership over the role of shots against data entry, when selected or checked. In this example the shots against role allows the user to select the location of a shot, select the player who took the shot, if the shot was on net or missed, if the shot was on net how the goalie stopped the puck (blocker, trapper, pads, etc.), if the shot was missed how it was missed (blocked, wide, high, etc.), if the shot resulted in a goal, and if the shot was a goal where in the net the goal was scored. It will be apparent to one skilled in the art that more, less or different events may also be included in this role. FIG. 5 and associated descriptions provide additional details.

In some embodiments the shots for 323 and shots against 324 may be combined into a single role.

Figure 4:
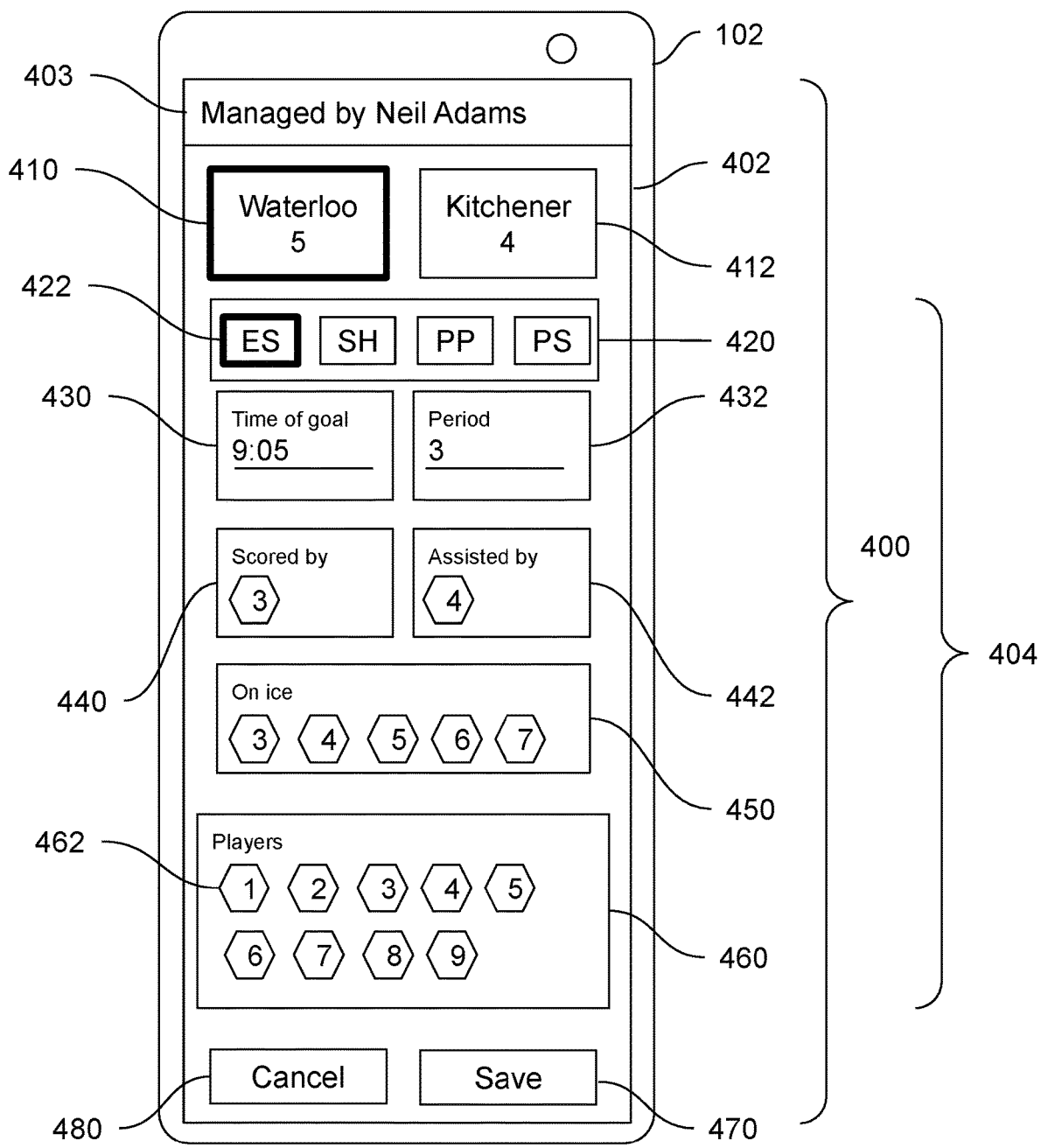
FIG. 4 is an illustration of the front view of an example electronic device displaying the data entry fields when a goal is scored in an ice hockey game, in accordance with an example of the present application.

In the illustrated example, the editable field 325 is used to assign the event input device ownership over the role of goal data entry, when selected or checked. In this example the goal role allows the user to enter the time of the goal, the period in which the goal occurred, the player who scored the goal, the player or players who assisted the goal, the players that were on the ice when the goal was scored, the type of goal (even strength, power play, short handed, penalty shot, etc.). It will be apparent to one skilled in the art that more, less or different events may also be included in this role. FIG. 4 and associated descriptions provide additional details.

In the illustrated example, the editable field 326 is used to assign the event input device ownership over the role of penalty data entry, when selected or checked. In this example the penalty role allows the user to enter the time of the penalty, the period in which the penalty occurred, the player or players who received the penalty, the type of penalty (body checking, high sticking, cross checking, etc.), the penalty (2 minutes, 4 minutes, game misconduct, minor penalty, major penalty, etc.). It will be apparent to one skilled in the art that more, less or different events may also be included in this role.

In the illustrated example, the editable field 327 is used to assign the event input device ownership over the role of on ice players data entry, when selected or checked. In this example the on ice role allows the user to enter which players are on the ice at any given time, including when a player leaves the bench or penalty box and comes onto the ice, when a player leaves the ice and enters the bench or penalty box, or any other player movements to and from the ice or game play.

In the illustrated example, the text fields 330 and 332 are used to show which roles are already owned by other event input devices 210. For example the time role 321 is currently owned by the user Neil Adams 330 and the shots for role 323 is currently owned by the user John Smith 332. In one embodiment the current event input device 210 may take ownership of a role already assigned (321 and 323), in another, an already assigned role (321 and 323) may not be taken by another event input device 210.

In the illustrated example, the editable fields 320-327, when selected or deselected, sends a role ownership change message to the server 230. The role ownership change message parameters may include the user identifier, user name and the list of game roles selected or deselected. Many other message parameters or combinations with more or less parameters are possible. The server 230 sends the role ownership information to the other event input devices 210 for displaying in similarly displayed game roles selection screen 184, such as those illustrated in the text fields 330, 332.

FIG. 4 illustrates an example user interface displaying the data entry fields for a goal device 214, allowing the user to input a goal scored in an ice hockey game, in accordance with an example of the present application. In the illustrated example, a sports application 110 is executing on the electronic device 102.

As illustrated, an example user interface 400 of the sports application 110 is displayed on a screen 402 of the electronic device 102.

The example user interface 400 includes fields 403-480 that are outputted by the sports application 110.

In the illustrated example, the managed by field 403 displays the name of the user responsible for entering goal information. Referring back to FIG. 3, this is the user that signed up for tracking goals by selecting the checkbox at 325 and referred to in the system 200 as the goal event input device 214.

In the illustrated example, the goal for button 410 shows the team's name (Waterloo) and current goals for (5) and the goal against button 412 shows the opponent's name (Kitchener) and current goals against (4). The goals for button 410 is shown with a thicker border indicating it is selected and the user is entering a goal for. The fields 404 may change depending on if the goal is a goal for (410 selected) or a goal against (412 selected). For example, for a goal against 412, the scored by player 440 and assisted by player 442 may not be of interest to the team and may therefore be hidden.

In the illustrated example, the time of the goal and the period the goal was scored can be entered by the user into the editable fields 430 and 432 respectively. The time field 430 and period field 432 may be updated automatically for the user when the time event input device 211 updates the game time when the clock stops due to the goal.

In the illustrated example, the player selection control 460 allows the selection of the players required to populate the score by field 440, assisted by field 442 and the on ice field 450. In some embodiments the player selection control 460 shows a list of all players on the team. In another embodiment the player selection control 460 is broken into 2 sections, forwards and defence players. In another embodiment the player selection control 460 has a section for players that were recently involved in other related events (for example goals, faceoffs or shots). In another embodiment the player selection control 460 has a section for players that were known to be on the ice at the time of the goal. Other possible player configurations are possible. In another embodiment, the player selection control 460 is limited to the players that are present at the game (absent players are not shown) or that were on the ice at the time of the goal. In another embodiment, voice input can be used to select a player.

In the illustrated example, the goal type field 420 allows the user to specify the type of goal: ES (Even strength), SH (short handed), PP (power play), or PS (penalty shot). In the illustrated example the ES button 422 is shown with a thicker border indicating it is selected and the user is entering an even strength goal. The goal type field 420 may be automatically populated by the penalty event input device 216, the on ice event input device 217, another event input device 210, an external device 250, or combination thereof.

In the illustrated example, the scored by player field 440 allows the user to specify which player scored the goal. In the illustrated example, the player with jersey number 3 is identified as the player who scored. The scored by player 440 may be automatically populated by the shots for event input device 213, the shots against event input device 212, another event input device 210, an external device 250 or combination thereof.

In the illustrated example, the assisted by players field 442 allows the user to specify which player or players assisted the goal. In the illustrated example, the player with jersey number 4 is identified as the player who assisted. The assisted by player 442 may be automatically populated by the shots for event input device 213, another event input device 210, an external device 250, or combination thereof.

In the illustrated example, the on ice players field 450 allows the user to specify which players were on the ice at the time of the goal. In the illustrated example, the players with jersey numbers 3, 4, 5, 6, 7 are identified as the players who were on the ice at the time of the goal. The on ice players field 450 may be automatically populated by the on ice event input device 217, another event input device 210, an external device 250, or combination thereof. In another embodiment, a scoreboard 252 acting as an event input device may provide one or more of the parameters for the goal event input.

When the "Save" button 470 is selected, the sports application 110 sends the completed event (period, time, goal type, scored by player, assisted by players, players on ice, statistics, etc.) and generated statistics to the server 230 to store as event records 231 and statistics records 233.

FIG. 5 illustrates an example user interface displaying the data entry fields, for a shot for device 213 and a shot against device 212, allowing the user to input a shot for or shot against in an ice hockey game, in a single screen user interface, in accordance with an example of the present application. In the illustrated example, a sports application 110 is executing on the electronic device 102.

As illustrated, an example user interface 500 of the sports application 110 is displayed on a screen 502 of the electronic device 102.

The example user interface 500 includes editable fields 503-544 that are outputted by the sports application 110.

In the illustrated example, the managed by field 503 displays the name of the user responsible for entering shots information. Referring back to FIG. 3, this is the user that signed up for tracking shots by selecting the checkbox at 323 or 324 and referred to in the system 200 as the shots for event input device 213 or the shot against input device 212.

In the illustrated example, the rink field 510 is used to select the location of the shot 516. The shot can be stored as an x, y coordinate relative to any starting location on the rink, or as an x, y percentage from any starting location on the rink (for example 50%, 50% is the centre of the rink starting from the top left) or in other coordinate systems known to those skilled in the art.

In the illustrated example, the player indicator 518 is used to represent the player associated with the shot being entered. The player indicator 518 is represented in the example as a hexagon with the players jersey number in the centre. In the illustrated example, the shot on net 512 and missed shot 514 buttons are used to select if the shot was on net or missed respectively. When the shot on net 512 or missed shot 514 buttons are selected, the user maybe asked for additional information (shot details) about the shot before it is committed (not shown), including but not limited to: how the goalie saved the shot (blocker, trapper, pads, etc., if the shot was on net), the location of the goal in the net (if the shot resulted in a goal) and how the shot was missed (blocked, wide, high, post, crossbar, etc., if the shot was missed). After the shot details are entered, the sports application 110 sends the completed shot event to the server 230 which stores the event in the event records store 231 and statistics records store 233.

In the illustrated example, the shots for button 520 and shots against button 522 are used to select if the shot being taken is a shot for or against respectively. When the shots for button 520 button is pressed the rink 510 may highlight the area of the rink where a shot for is most likely to be taken (the offensive zone for the team). When the shots against button 522 is pressed the rink 510 may highlight the area of the rink where a shot against is most likely to be taken (the defensive zone for the team).

In the illustrated example, the player selection control 540 allows the selection of the player taking the shot 518, or the goalie the shot was taken on. In some embodiments the player selection control 540 shows a list of all skaters on the team when a shot for button 520 is selected and a list of goalies when a shot against 522 is selected. In another embodiment the player selection control 540 is broken into 2 sections, forwards and defence players. In another embodiment the player selection control 540 shows only goalies. In another embodiment the player selection 540 also shows players that recently took a shot or goalies that recently received a shot. In another embodiment, the player selection control 540 is limited to the players that are present at the game (absent players are not shown). Other player configurations are possible. In another embodiment, voice input can be used to select a player.

In the illustrated example, the editable field 530 is used to select if the shot being entered is a goal. The goal field 530 may be updated automatically by parameters from the goal input device 214, another event input device 210 or an external device 250.

FIG. 4 and FIG. 5 have been presented for purposes of illustration and description and are not intended to be exhaustive or limit the invention to the form disclosed. Many modifications and variations will be apparent to those of ordinary skill in the art, depending on the type of event or events being captured and the sport being tracked.

FIG. 4 and FIG. 5 illustrate example user interfaces for displaying the data entry fields for 2 sample event input devices, namely a goal event input device 214 and combined shots for event input device 213 and shot against event input device 212, for an ice hockey game.

There are many other game event input types for ice hockey that would have a different user interface appropriate for that type of event. For example the faceoff event could have a rink field to select the location of the faceoff, a player indicator, a player selection field, or buttons to select a faceoff win or loss.

FIG. 6 illustrates an example user interface displaying a game play-by-play on a client device 220 that was generated by event input devices 210 for an ice hockey game, in accordance with an example of the present application. In the illustrated example, a sports application 110 is executing on the electronic device 102.

As illustrated, an example user interface 600 of the sports application 110 is displayed on a screen 602 of the electronic device 102.

The example user interface 600 includes fields 610-652 that are outputted by the sports application 110.

In the illustrated example, the scoreboard field 610 displays the current score 614 and 616 for the team and opponent team respectively. The score may be updated manually by a time input device 211, by marking a shot as a goal on a shot against input device 212, by marking a shot as a goal on a shot for input device 213, by entering a goal on a goal input device 214, by an external scoreboard 252 acting as an event input device 210, as a combination of the above or by other means.

In the illustrated example, the scoreboard field 610 displays the period 612 and time 618. The period 612 and time 618 maybe updated manually by a time input device 211, by starting and stopping a running game timer on a time input device 211, as a result of entering a goal which specifies the time of the event by a goal event input device 214, as a result of entering a penalty which specifies the time of the event by a penalty input device 216, as a result of entering any game event input that includes the time from an event input device 210, by an external scoreboard 252 acting as an event input device 210, or combination of the above.

In the illustrated example, the play by play fields 603 provides a scrollable list of the game events entered by the event input devices 210, client devices 220, or external devices 250.

A period started is shown at field 620 and was generated similar to the current period 612 as described above.

A shot against event is shown at field 622 and was generated by a shot against event input device 212, another event input device 210, an external device 250, or combination thereof.

A penalty event is shown at field 624 and was generated by a penalty event input device 216, by an external scoreboard 252 acting as an event input device 210, another event input device 210, an external device 250, or combination thereof.

A faceoff event is shown at 626 and was generated by a faceoff event input device 215, another event input device 210, an external device 250, or combination thereof.

A shot for event is shown at 628 and was generated by a shot for event input device 213, another event input device 210, an external device 250, or combination thereof.

A goal event is shown at 630 and was generated by a goal event input device 214, a shot for event input device 213, a shot against event input device 212, an external scoreboard 252 acting as an event input device, another event input device 210, an external device 250, or combination thereof.

In one embodiment a game event may be up-voted if the user agrees with the event using the thumbs up field 650 or down-voted if the user disagrees with the event using the thumbs down field 652.

A cheer input field 640 allows client devices 220 or game update event input device 218 to send a cheer to the team or add additional commentary on the events of the game. The send cheer field 642, when pressed, generates a game event containing the cheer and sends it to the server 230 to store as an event record 231.

A cheer event is shown at 632 which was sent from a client device 220 or event input device 210 from a user named Neil Adams.

A media game event is shown at 634 and was generated by a communication system 254, an event input device 210, an event input device 210 listening for notifications from a system service broadcasting song information based on ambient noise, a client device 220, an external device 250, or combination thereof.

The scoreboard 610 and events 620-634 were generated by one or more event input devices 210, client devices 220, server 230 or external devices 250, that when put together in FIG. 6 provide a complete play-by-play or "picture" of the events of a game.

The system may include a method for resolving conflicts resulting from the overlap of event data received from two or more event input devices 210 or resulting from inaccurate data reported by one or more event input devices 210. For example when a goal is scored, the scored by player may be reported differently by the shots for device 213, the scoreboard 252 and the goal device 214. In another example the goal device 214 reports the incorrect assisted by player. In one embodiment the conflict is detected and resolved manually by one or more event input devices. In another embodiment the client device 220 provides a user interface (as shown in FIG. 6) allowing a user to up-vote or down-vote any game event shown in the play-by-play. When the user up-votes a game event using the thumbs up button 650 or down-votes a game event using the thumbs down button 652 a counter is incremented and decremented respectively in the associated game event in the corresponding event record 231, although other similar means are possible.

In one embodiment the server 230 detects inaccuracies or inconsistencies based on a threshold number of down votes compared to the number of up-votes in a game event. In an embodiment the client device 220 provides a suggested resolution after the user down votes a game event. For example if a user believes the goal was scored by another player they press the down-vote button 652 of the "goal by" game event 630 and are prompted to select the player they believe did score the goal.

In one embodiment the server automatically adjusts the game event after a threshold number of client devices 220 or event input devices 210 report similar findings.

In another embodiment an event input device 210 is prompted with the conflict or inaccuracy and the user must manually resolve the conflict. Additional context may be provided based on the client device 220 and event input device 210 results that were gathered by users voting on the event using fields 650 and 652 in order to assist with the choice. For example, in FIG. 6, the goal event 630 reports that the goal was scored by player #16 Makenna Adams, but ten client devices 220 report #3 Ruari Adams as the player who scored and five client devices 220 report #14 Gavin Adams and the player who scored the goal. The server 230 detects 15 votes against the event which triggers a conflict resolution to resolve the issue by sending a resolution request message to the goal event input device 214, which is the device that originally reported the issue. In another embodiment the conflict resolution is done by an event input device 210 that did not submit the original goal event. In another embodiment the conflict resolution is done by an event input device 210 that has an assigned role of "mediator" to specifically handle resolving events. Further description of this example event and the event resolution mechanism is described below in the context of FIG. 11 and FIG. 12.

Figure 11:
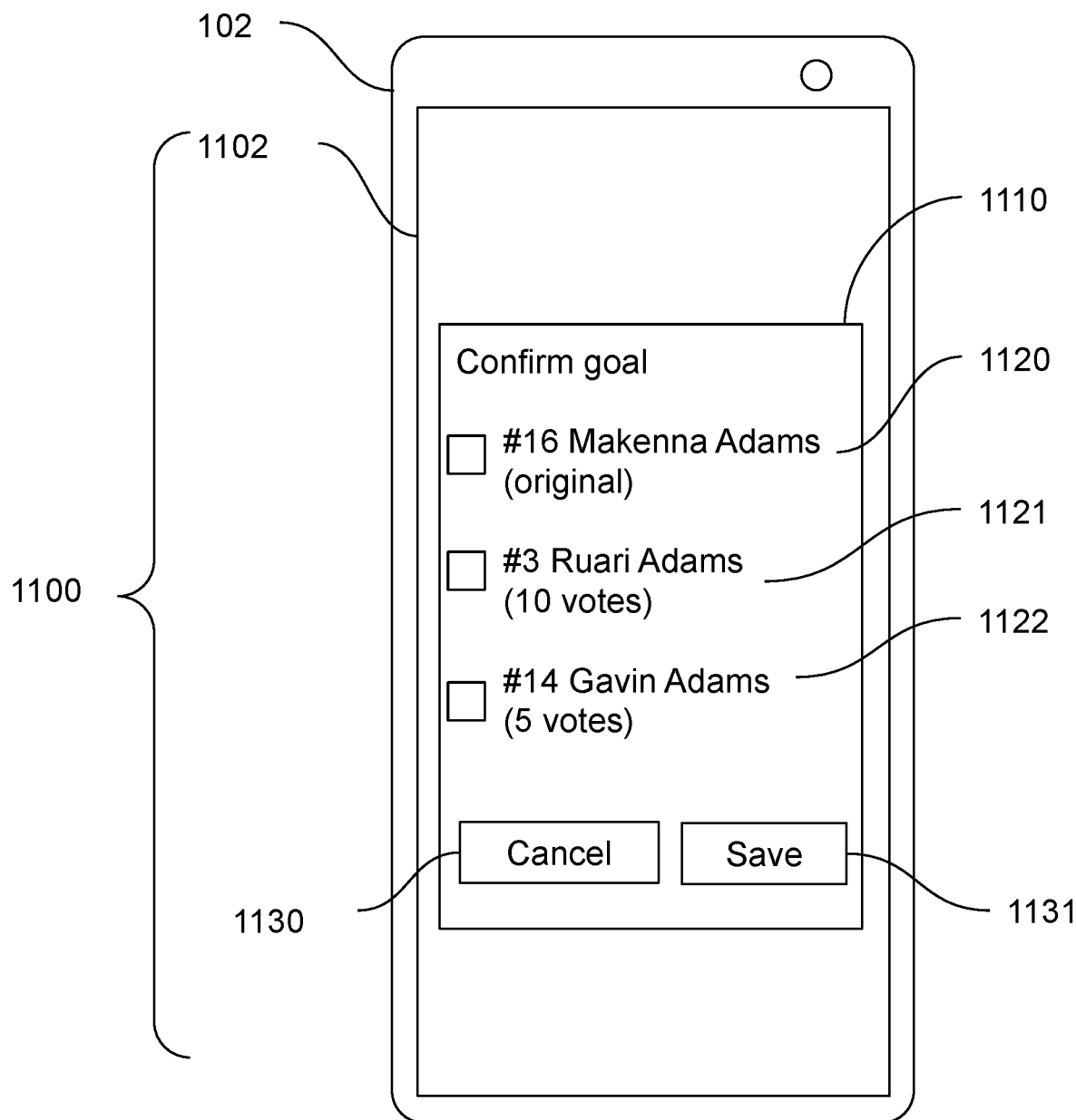
FIG. 11 is an illustration of the front view of an example electronic device displaying the data entry fields when a conflict is detected in a game event in an ice hockey game, in accordance with an example embodiment of the present application.

FIG. 11 illustrates an example user interface displaying a conflict resolution screen 188 on an event input device 210 that was generated by event input device 210 for an ice hockey game, in accordance with an example of the present application. In the illustrated example, a sports application 110 is executing on the electronic device 102. As illustrated, an example user interface 1100 of the sports application 110 is displayed on a screen 1102 of the electronic device 102.

In FIG. 11, the goal event input device 214 prompts the user to confirm the player who scored the goal and provides options #16 Makenna Adams (original) 1120, #3 Ruari Adams (10 votes) 1121 and #14 Gavin Adams (5 votes) 1122. When the "Save" button 1131 is selected, the sports application 110 sends an updated event to the server 230 which is stored as event records 231 and statistics records 233.

Figure 12:
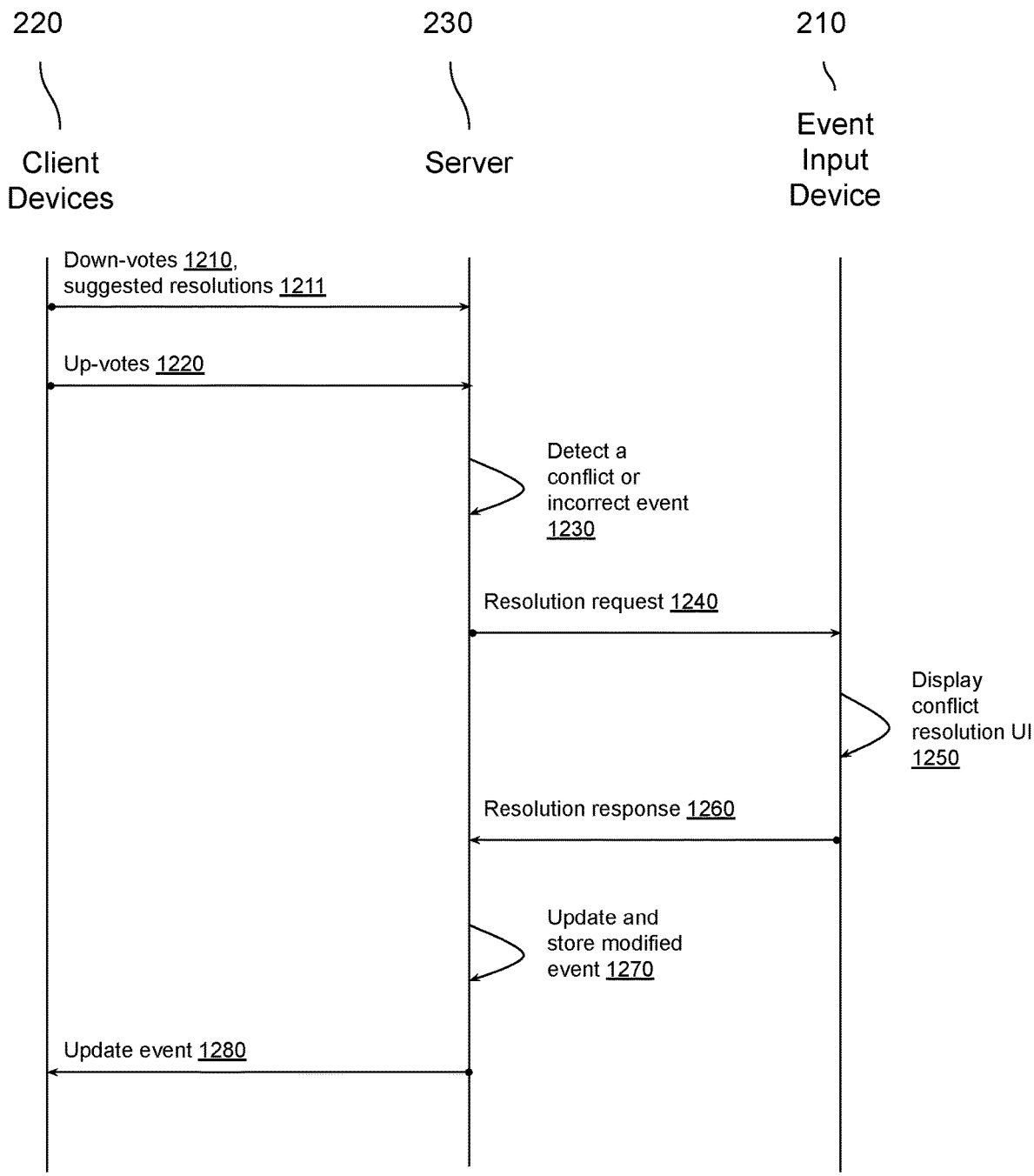
FIG. 12 is a data flow diagram showing possible flows of messages and data between devices and a server for the purpose of resolving conflicts or inaccuracies, in an ice hockey game, in accordance with an example embodiment of the present application.

FIG. 12 is a data flow diagram showing possible flows of messages and data between client devices 220, the server 230 and an event input device 210 for the purpose of resolving conflicts or inaccuracies (or "issues" going forward) reported by client devices 210, detected by the server 230 and resolved by an event input device 210, in an ice hockey game, in accordance with an example of the present application.

A plurality of client devices 220 send down-votes 1210 (corresponding to thumbs-down selections 652 FIG. 6) and send up-votes 1220 (corresponding to thumbs-up selections 650 FIG. 6) to the server 230. The client devices 220 may also send suggested resolutions 1211 which provides information on what the client device (or user) believes is the correct information for the event. For example, for a goal event, the suggested resolutions 1211 may include the player who is believed to have actually scored the goal.

The server 230 detects a conflict or inaccuracy at 1230 based on a threshold number of down-votes vs up-votes. For example if there are more than 5 down-votes vs the number of upvotes an issue is detected. Other possible mechanisms for detecting issues are possible.

After detecting an issue, the server 230 generates and sends a resolution request message 1240 to an event input device 210. The device may be the device that originally reported the game event, a mediator device, or any other device capable of resolving conflicts. The resolution request message 1240 contains the original game event, any suggested resolutions, the number of down-votes for each suggested resolution, the number of up-votes for the original event, the number of downvotes for the original event, and any other information to assist in resolving the issue.

The event input device 210 displays a conflict resolution user interface screen 188 (FIG. 11). After the user resolves the conflict (see description for FIG. 11), the event input device 210 sends a resolution response message 1260 to the server 230. The resolution response message 1260 contains the original game event (or identifier), and any information needed to correct the issue. For example if the original event was a goal event that had a potential issue with the player who scored the goal the update may contain a new player to credit with the goal.

The server 230 updates and stores the modified game event and statistics in the event records 231 and statistics records 233. The updated event is sent to the client devices 220 where the process may be repeated. In another embodiment the process may only be completed a fixed number of times. In another embodiment the event input device may indicate when the process has ended. For example the event input device 210 may contain a "don't ask again" checkbox in the conflict resolution user interface 188, which when selected prevents the server from sending any further resolution request messages 1240 to event input devices 210 for this particular event or all future events for this game.

FIG. 7 illustrates an example user interface displaying statistics for a single game that was generated by event input devices 210, or external device 250, in an ice hockey game, in accordance with an example of the present application. In the illustrated example, a sports application 110 is executing on the electronic device 102.

As illustrated, an example user interface 710 of the sports application 110 is displayed on a screen 702 of the electronic device 102.

The example user interface 710 includes fields 704-744 that are outputted by the sports application 110.

In the illustrated example, the title, date and time of the game 704 provide a context for the statistics fields below. In other embodiments the user can select which game, player, team or splits they wish to view statistics for.

In the illustrated example, faceoff statistics for the game are shown in a table 720, with a column header 722 showing the player #, player name, number of faceoffs (FO), number of faceoff wins (W), number of faceoff losses (L) and faceoff win percentage (FO %) with 3 players (#3 ADAMS, #14 SMITH, #16 JONES) and their corresponding statistics 724 displayed. The faceoff statistics shown in table 720 were generated from the faceoff event input device 215, another event input device 210, or an external device 250 capable of creating faceoff statistics.

In the illustrated example, shots for statistics for the game are shown in a table 730, with a column header 732 showing the player #, player name, number of shots (S), number of missed shots (MS), number of goals (G) and shot percentage (S %) with 3 players (#3 ADAMS, #14 SMITH, #16 JONES) and their corresponding statistics 734 displayed. The shots for statistics shown in table 730 were generated from the shots for event input device 213, another event input device 210, or external device 250, capable of creating shots for statistics.

In the illustrated example, points statistics for the game are shown in a table 740, with a column header 742 showing the player #, player name, number of goals (G), number of assists (A), points (PTS) and plus minus (+/−) with 3 players (#3 ADAMS, #14 SMITH, #16 JONES) and their corresponding statistics 744 displayed. The point statistics shown in table 740 were generated from the goal event input device 214, the shots for event input device 213, the shots against event input device 212, another event input device 210, or external device 250 capable of creating player point statistics.

The data for each statistics table 720, 730, 740 was generated by one or more event input devices 210, or zero or more external devices 250, that when put together in FIG. 7, provide a complete picture of the statistics for a game, split, player or team.

FIG. 7 shows 3 example statistics tables 720, 730, 740 as examples in an ice hockey game. It will be apparent to one skilled in the art that additional statistical tables, the amount of data in the tables, the titles, the column headers, the columns, the rows, the layout of the tables, or the type of data (other sports would have much different data and statistics) are possible.

In alternative embodiments, alternative user interfaces may be utilized for selection of game roles (FIG. 3), the input of game event data (FIG. 4, 5), the display of game event data (FIG. 6), the display of statistics (FIG. 7), or the input of conflict resolution data (FIG. 11).

Figure 8:
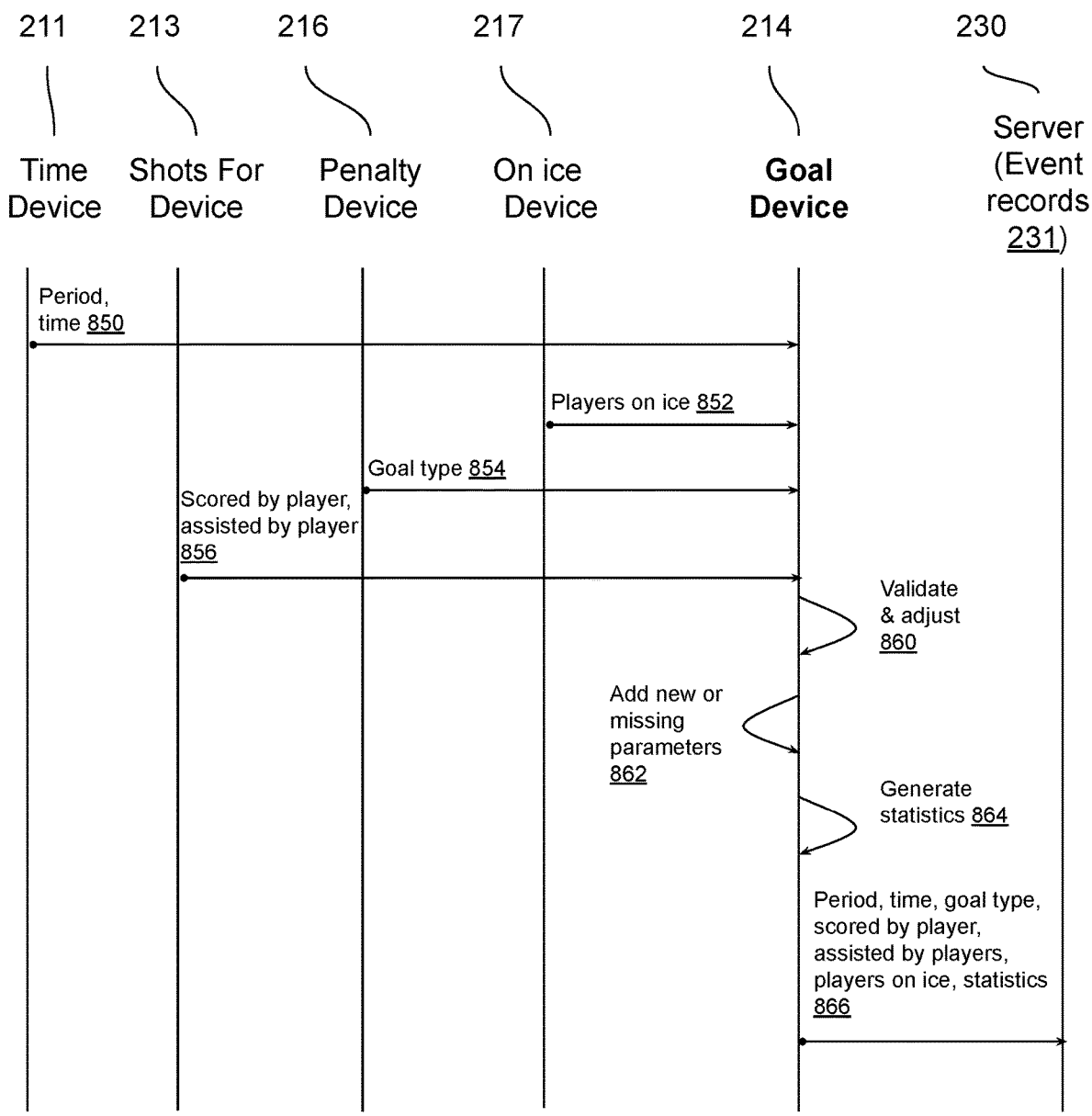
FIG. 8 is a data flow diagram, showing possible flows of messages and data between devices and a server for the purpose of simplifying data entry of a goal, in an ice hockey game, in accordance with an example embodiment of the present application.

FIG. 8 is a data flow diagram showing possible flows of messages and data between event input devices 210 and a server 230 for the purpose of simplifying data entry for the goals event input device 214 in an ice hockey game, in accordance with an example of the present application.

A time event input device 211 sends the period and time remaining in the period (minutes and seconds) 850 to the goal event input device 214.

An on ice event input device 217 sends a list of players 852 that were on the ice at the time of the goal to the goal event input device 214.

A penalty event input device 216 sends the goal type 854 (even strength, short handed, power play, penalty shot, etc.) to the goal event input device 214.

A shot for event input device 213 sends the scored by player (player name and identifier) and assisted by player 856 to the goal event input device 214.

Goal input device 214 may then allow validation and adjustment 860 of data received 850-856 followed by input of new or missing parameters 862. At 864, the goal input device 214 generates team and player statistics for the goal scored. For example a player receives 1 point for a goal, 1 point for an assist, a +1 towards their +/− if a player was on the ice during an even strength or short handed goal for, or a −1 towards their +/− if they were on the ice during an even strength or power play goal against. Many other statistics are possible. Statistics may be tracked for each individual player, group of players, for the team, for a period or for an individual game or splits. In another embodiment the statistics generation 864 is done on a server 230 or a combination of device and server. The completed event (period, time, goal type, scored by player, assisted by players, players on ice, statistics, etc.) 866 is sent to the server 230 which aggregates and stores the information as event records 231 and statistic records 233 to be displayed on client devices 220 on event display screen 182 and statistics display screen 186. In another embodiment, data is stored locally before being uploaded to the server.

It is to be noted that FIG. 8 is only an example and that the number, nature, types, order, and/or directions of the messages and the data between the various components may be different in other embodiments. For example, the order of the messages sent to the goal input device 214 will depend on the time at which the events are added on the other event input devices 210, the time required to send the event to the server 230, the availability of a connection to the network 240, the server 230 processing time, the speed at which the user of the goal event input device 214 enters the data themselves, amongst other considerations.

It is also to be noted that the number of devices sending data to the goal device 214 and the data that each sends may be different in other embodiments. For example in another embodiment the scored by player and the goal type are both tracked and sent by the same device. In another embodiment a scoreboard 252, or other external device 250 also provide event parameters to the goal event input device 214. It will be apparent to one skilled in the art that many combinations of input devices capturing game input data are possible.

Figure 9:
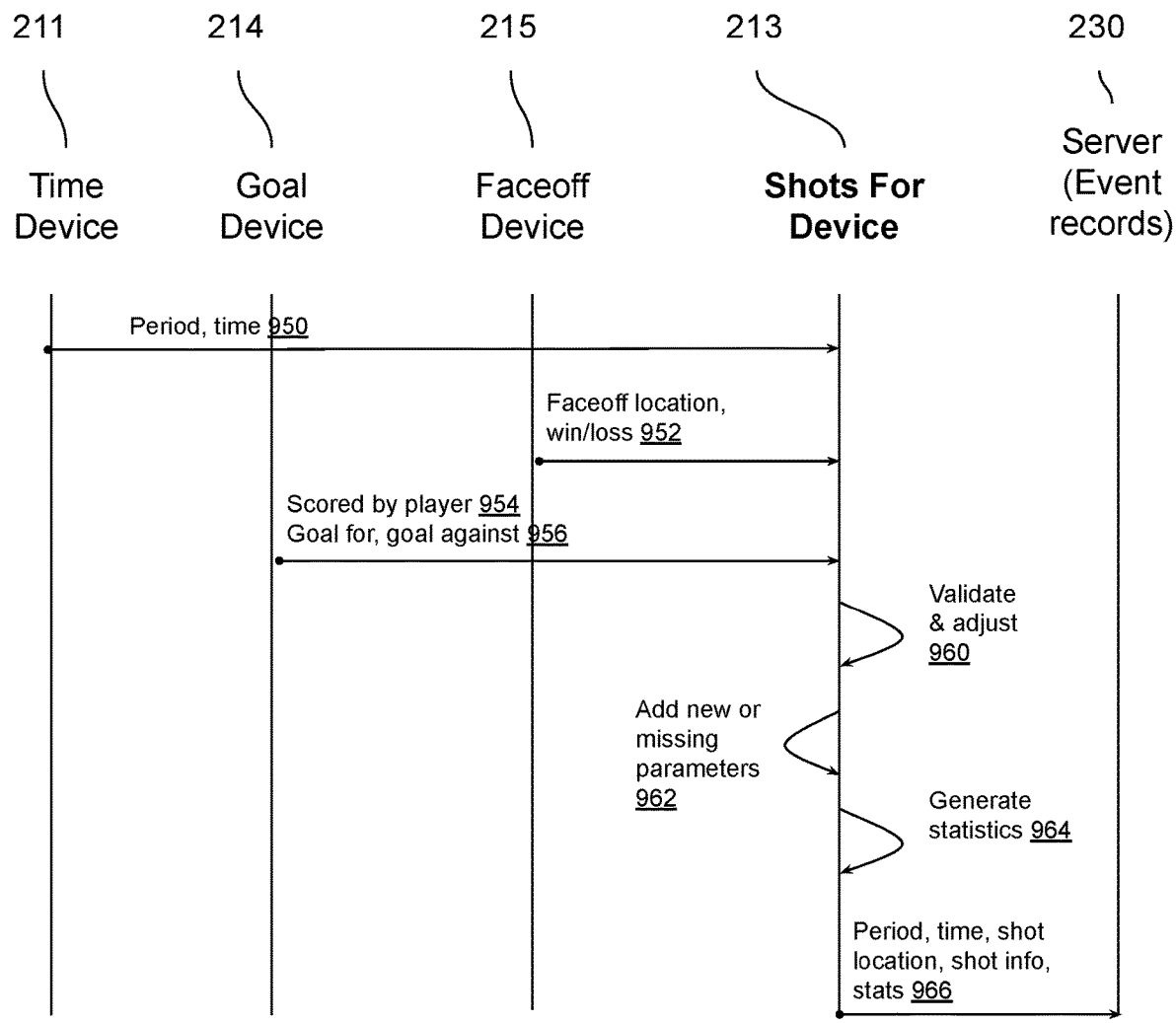
FIG. 9 is a data flow diagram showing possible flows of messages and data between devices and a server, for the purpose of simplifying data entry of a shot, in an ice hockey game, in accordance with an example embodiment of the present application.

FIG. 9 is a data flow diagram showing possible flows of messages and data between event input devices 210 and server 230 for the purpose of simplifying data entry for the shots for event input device 213, in an ice hockey game, in accordance with an example of the present application.

A time event input device 211 sends the period and time remaining in the period (minutes and seconds) 950 to the shots for event input device 213.

A faceoff input device 215 sends the faceoff location and result (win/loss) 952 to the shots for input device 213. The faceoff information 952 may assist in the general location of the next shot as well as if the shot is for or against. For example, while referring to FIG. 5, if a user is managing shots for event input 213 and shots against event input 212, and a faceoff is won by the team in the offensive zone, the event input device 210 may automatically select the shot for button 520 and highlight the offensive zone in the rink field 510 since it is more likely the next shot to be taken is by the team since they have possession in the offensive zone. In another embodiment, if a user is managing the faceoff event input 215 and the shots for event input 213 or the shots against event input 212, the system may automatically switch from the faceoff event input screen 180 to the shots for or shots against input screens 180 (shown in FIG. 5), since a shot typically follows a faceoff.

A goal input device 214 sends the scored by player 954, and goal for/against indicator 956 to the shots for input device 213. Referring again to FIG. 5, the shot player 518 can be automatically set to the scored by player 954 sent from the goal event input device 214. The goal indicator 530 can be selected or checked if a scored by player 954 or goal for/against indicator 956 are received from the goal event input device 214. The shots for button 520 or shots against button 522 can be selected based on the goal for/against indicator 956.

Shots for event input device 213 may then allow validation and adjustment 960 of data received 950-956 followed by input of new or missing data 962.

At 964 the shot for device 213 generates statistics for the shot taken. For example for a shot on net, the count of shots on net increases by 1, for a missed shot, the count of missed shots increases by 1, the shot percentage is the percentage of shots that resulted in goals, a shot that results in a goal increases the players points and possibly their +/− statistic. Many other statistics are possible. Statistics may be tracked for each individual player, group of players, for the team, for a period or for an individual game or split. In another embodiment the statistics generation 964 is done on a server 230 or a combination of device and server.

In some embodiments there may be overlap in the statistics generated. For example if a shots for event input device 213 and goal event input device 214 are both being used, a player's points (and other stats) may be duplicated. This problem can be resolved by the event input devices 210 being aware of the other devices being used in a game and ensuring that only one of those devices generates the statistics. In another embodiment the stats are tracked and stored separately and resolved by the server 230 or a user choosing which one to use—for example by referring to the official game sheet. Other resolution techniques are possible.

At 966 the completed event (period, time, shot location, shot info, stats, etc.) and statistics are sent to the server 230 which aggregates and stores the information as event records 231 and statistic records 233 to be displayed on client devices 220 on event display screen 182 and statistics display screen 186. In another embodiment, data is stored locally before being uploaded to the server.

It is to be noted that FIG. 9 is only an example and that the number, nature, types, order, and/or directions of the messages and the data between the various components may be different in other embodiments. For example, the order of the messages sent to the shots for input device 213 will depend on the time at which the events are added on the other event input devices 210, the time required to send the event to the server 230, the availability of a connection to the network 240, the server 230 processing time, the speed at which the user of the shots for event input device 213 enters the data themselves, amongst other considerations.

It is also to be noted that the number of devices sending data to the shots for device 213 and the data that each sends may be different in other embodiments. In another embodiment, a scoreboard 252, or other external device 250 also provide event parameters to the shots for event input device 213. It will be apparent to one skilled in the art that many combinations of input devices capturing game input data are possible.

FIG. 8 and FIG. 9 and accompanying descriptions both show the messages and data going directly between event input devices 210 for simplicity, but in the example embodiment the data is transmitted over the network 240 to the server 230, stored and processed by the server 230, sent back over the network 240 to the event input devices 210, although the route and number of components may differ in other embodiments.

Figure 10:
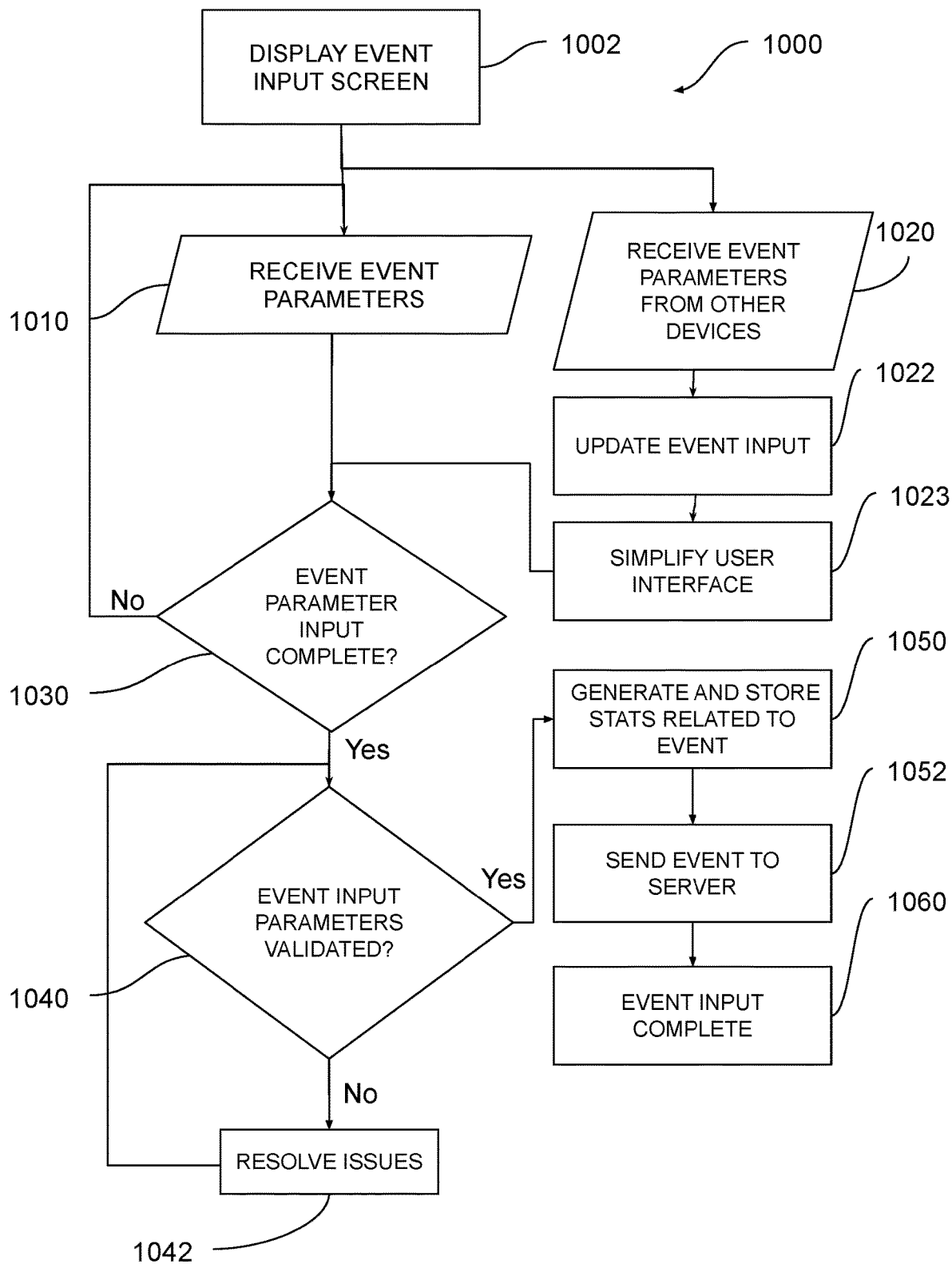
FIG. 10 illustrates, in a flowchart form, a method of receiving, processing and sending a game event, in accordance with an example embodiment of the present application.

FIG. 10 is a flowchart showing an example process 1000 for an event input module 112, on an event input device 210, for receiving, processing and sending a game event, according to an implementation. The method 1000 includes operations that are carried out by one or more processors of the one or more event input devices 210, one or more external devices 250 or the server 230. The method 1000 may be implemented, at least in part, through processor executable instructions associated with the sports application 110, the event app 232, the statistics app 233. In some examples, one or more operations may be implemented via processor-executable instructions in other applications or in an operating system stored and executed in memory of the event input device 210, the server 230, external devices 250. The process 1000 can be implemented by an electronic device, e.g., the electronic device 102 showing in FIG. 1. The process 1000 shown in FIG. 10 can also be implemented using additional, fewer, or different entities. Furthermore, the process 1000 shown in FIG. 10 can be implemented using additional, fewer, or different operations which can be performed in the order shown or in a different order. In some instances, an operation or group of the operations can be iterated or repeated, for example, for a specified number of iterations or until a terminating condition is reached.

The process starts at 1002 with the display of an event input screen 180. FIG. 4 and FIG. 5 are example user interfaces of event input screens 180 according to an implementation. The event input screen 180 may be shown in response to user input on the current event input device 210, in response to a message from another event input device 210, in response to a message from a server 230, in response to an external device 250, in response to a message from a scoreboard 252, or other such input.

Referring back to FIG. 4 and FIG. 5 that illustrate 2 examples of event input screens. FIG. 4 shows an example event input screen 400 for entering a goal type event in an ice hockey game. FIG. 5 shows an example event input screen 500 for entering a shot type event in an ice hockey game. Other examples are possible for different types of events and different types of sports.

At 1010 the event input device 210 receives zero or more event parameters. An event parameter could be the time the event occurred, the player or players involved in the event, the type of event, details specific to the type of event, the result of the event, or any other such parameters worth recording about the event. For example in an ice hockey game, the time event could include event parameters such as the period and how much time is left in the period. In another example, in an ice hockey game, a faceoff event could include event parameters such as the time of the faceoff, the player that took the facebook and if the player won or lost the faceoff. In another example, in an ice hockey game, the shot for event could include event parameters such as the shot location on the rink, if the shot was on net or missed, the type of shot taken (for example wrist shot, slat shot, snap shot, etc.), the location of the shot on the net, among others.

At 1010, event parameters can be received from a user providing manual input into the event input screen 180 by touch, swipe, gesture, voice, physical keyboard, virtual keyboard, or any other user interface input method.

At 1020 the event input device 210 may receive events or event parameters from other event input devices 210, external devices 250 or the server 230 via its communication subsystem 166. These parameters may be received before, during or after the events parameters are received from the user at 1010.

At 1022 the event input device 210 may update the editable fields of the event input screen 180 using the events or event parameters received at 1020.

Referring back to FIG. 4 and FIG. 8 which illustrate an example user interface of a goal input and messages sent between event input devices 210 and the server 230. For example the device 214 receives the scored by player 856 and updates the scored by field 440 with the scored by player 856. Alternatively the scored by field 440 may not be updated automatically if the user has already entered a player. Alternatively or in combination, the user is prompted or notified in some manner that a scored by player 856 is available to be used with this event. Alternatively or in combination, the user is prompted if there is a conflict between data they have entered and data received by another event input device 210. Similarly the assisted by field 442 may be updated by the assisted by player 856.

At 1023 the event input device 210 may simplify the editable fields of the event input screen 180 using the events or event parameters received at 1020.

Referring back to FIG. 4 which illustrates an example user interface of a goal input and FIG. 8 which illustrates messages sent between event input devices 210 and the server 230. For example the goal event input device 214 receives the players on ice 852 from the on ice device 217 via the server 230 (not shown in FIG. 8). The players selection control 460 (FIG. 4) can then be updated to only show the players that were on the ice at the time of the goal, making it easier for the user to enter event input parameters at 1010. For example a typical ice hockey team may have 17 players requiring the user to scroll in order to find the players they are interested in. By limiting the player selection list 460 to only 5 players, the scored by field 440, the assisted by field 442 and the on ice field 450 are much easier for the user to populate since they only have to locate players in a list of 5 players versus a list of 17 players. In another embodiment the players hidden in the player selection list 460 are available using other means (for example they may be revealed after selecting a drop down expansion box). In another similar example, again using FIG. 4 and FIG. 8, the on ice field 450 is updated with the players on ice 852, received from on ice event input device 217 via the server 230 (not shown in FIG. 8).

Again, referring back to FIG. 4 which illustrates an example user interface of a goal input and FIG. 8 which illustrates messages sent between event input devices 210 and the server 230. In another example the goal event input device 214 receives the scored by player and assisted by player 856 from the shots for event input device 213 via the server 230 (not shown in FIG. 8). The players selection control 460 (FIG. 4) can then be updated to highlight the player who scored the goal (or scored the goal according to the input received by the shots for event input device 213), or highlight the player who assisted the goal (or assisted the goal according to the input received by the shots for event input device 213). Highlighting the player may be done by changing the colour of the player indicator 462, placing an overlay over the player indicator 462 or any other such indicator to differentiate the player 462 from the other players in the players selection control 460. By highlighting the player in the player selection control 460, the scored by field 440, the assisted by field 442 are much easier for the user to populate since they stand out against the other player indicators, additionally providing consistent data across event input devices 210. In another embodiment the scored by field 440 and the assisted by field 442 may be automatically populated by the scored by player and assisted by player 856 received from the shots for event input device 213.

At 1030 the event parameter input is complete when the user saves the event after entering parameters themself, using parameters from other event input devices 210 or external devices 250 as described above, or a combination thereof. For example, referring back to FIG. 4, the event parameter input is complete when the user selects the "Save" button 470.

At 1040 the event input parameters are validated and the user is prompted to resolve any issues found 1042. For example, referring back to FIG. 4, in an ice hockey game, for a goal event, if a player is listed as the scored by player 440 and the assisted by player 442, the validation check at 1040 would fail since a player can not score and assist on the same goal.

At 1050, once the event parameters are successfully validated, statistics related to the event can be generated for the player, group of players, team, period, game or splits. In another embodiment, the generation of statistics can be done on the server 230 or in combination with the server.

At 1052, the event parameters and statistics are sent to the server 230 and stored as event records 231 and statistic records 233 and then propagated out to the other event input devices 210, external devices 250 and client devices 220.

In another embodiment, the data is stored locally and sent to the server at a later time (for example if the device is offline).

The example process ends at 1060.

While this specification contains many details, these should not be construed as limitations on the scope of what may be claimed, but rather as descriptions of features specific to particular examples. Certain features that are described in this specification in the context of separate implementations can also be combined. Conversely, various features that are described in the context of a single implementation can be implemented in multiple embodiments, separately or in suitable sub-combinations.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementation described above should not be understood as requiring such separation in all implementations, and it should be understood that the described program components and system can generally be integrated together in a single software product or packaged into multiple software products.

Also, techniques, systems, subsystems, and methods described and illustrated in the various implementations as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

While the above detailed description has shown, described, and pointed out the fundamental novel features of the disclosure, as applied to various implementations, it will be understood that various omissions, substitutions, and changes in the form and details of the system illustrated may be made by those skilled in the art, without departing from the intent of the disclosure. In addition, the order of method steps are not implied by the order in which they appear in the claims.

In the present disclosure a variety of descriptive and intuitive names and labels have been used for the user interface elements such as buttons. These names and labels are not intended to be limiting and other descriptive and intuitive names and labels could be used. For example, rather than referring to the ownership of an event screen using "Managed by John Smith" at 503, "Tracked by John Smith" may be used instead.

What is claimed is:

1. A method for tracking events in a sports game, using one or more network-connected client or event input devices and a communication network, the method comprising:
   at least one of the one or more event input devices is a player device, receptor device or a player device proxied through a client, event or receptor input device, providing sensor data, events or statistics related to a specific player or group of players;
   receiving at least one of sensor data, events or statistics at the one or more event input devices;
   sending at least one of the sensor data, events or statistics by the one or more event input devices to a server over the communication network, the server being configured to store and manage the sensor data, events and statistics;
   generating, using the server, one or more insights from the sensor data, events or statistics from the event input devices, for the sports game, group of games, player or group of players;
   generating one or more notification messages based on one or more sensor data, events or statistics being within a normal range, outside of a normal range, exceeding a maximum, falling below a minimum or passing an average;
   sending one or more notification messages to the first player device, receptor device, client or event input device, or proxy client or event input device; and
   presenting the notification on the first player device, receptor device, client or event input device, or proxy client or event input device using one or more output methods available on the device.

2. The method of claim 1, wherein the sensor data, events, or statistics received from the one or more event input devices comprise one or more of time sensor data, heart rate sensor data, motion sensor data, acceleration sensor data, velocity sensor data, speed sensor data, distance sensor data, location sensor data, movement sensor data, gyroscope sensor data, accelerometer sensor data, temperature sensor data, pressure sensor data.

3. The method of claim 1, wherein the insights generated by the server includes a determination about a set of in-game or on-bench status of the one or more players, indicating whether each player is currently participating in the sports game, on the bench, or in any other designated status within the game.

4. The method of claim 1, wherein a determination of which players are in-game or on-bench is performed by one or more of the player devices, receptor devices, client devices, event input devices, proxy client devices, event input devices, or the server.

5. The method of claim 4, further comprising, upon determining the set of in-game or on-bench players:
   displaying one or more in-game players on the play-by-play, event input or statistics user interfaces of one or more client or event input devices; or
   displaying one or more on-bench players on the play-by-play, event input or statistics user interfaces of one or more client or event input devices.

6. The method of claim 4, further comprising, upon determining the set of in-game or on-bench players:
   updating one or more event input screens on the one or more event input devices to simplify or automate user interface input requirements based on the status of in-game or on-bench players, by using at least one of hiding, highlighting, disabling, deactivating, adding, switching, aligning, linking, combining, or changing user interface fields.

7. The method of claim 4, further comprising, upon determining the set of in-game or on-bench players:
   calculating which players are involved in a game event or game statistics using player sensor data, events or statistics; and
   associating the players with the game event or game statistics.

8. The method of claim 7, further comprising game events or game statistics which:
   include the player who scored a goal, the player or players who assisted on the goal, or the player or players that were in the game at the time of the goal or point.

9. The method of claim 1, further comprising, upon generating insights using the server from the received sensor data, events, or statistics:
   generating a warning notification message based on one or more health-related sensor data. events, or statistics that were generated, altered, aligned, or combined that are within a normal range, fall outside of a normal range, exceed a maximum, fall below a minimum, or pass an average.

10. The method of claim 1, further comprising, upon generating insights:
    detecting a player's shift length, shift start, shift end, shift duration, shift effort, shift count, shift intensity, shift power, shift performance, shift distance, or location, that exceeds a maximum, falls below a minimum, lies outside a normal or calculated range, or passes an average; and
    generating a warning notification message based on one or more of these detected conditions.

11. The method of claim 1, further comprising:
calculating by the server, receptor devices, player devices, event input devices, client devices, or proxy client or event input devices, at least one of shift time, shift start time, shift end time, shift duration, shift count, shift intensity, shift performance, shift effort, shift location, shift distance, shift displacement or shift power for zero or more players;
storing on the server, receptor devices, player devices, event input devices, client devices, or proxy client or event input devices, the shift time, shift start time, shift end time, shift duration, shift count, shift intensity, shift performance, shift effort, shift location, shift distance, shift displacement or shift power for zero or more players; and
displaying at the receptor devices, player devices, event input devices or client devices, the shift time, shift start time, shift end time, shift duration, shift count, shift intensity, shift performance, shift effort, shift location, shift distance, shift displacement or shift power for zero or more players.

12. The method of claim 1, further comprising, restricting a subset of player events, game events, sensor data, statistics, insights, notifications, or warning notifications to be visible only to a designated subset of player devices, receptor devices, client or event input devices, proxy client or event input devices, or the server, based on predefined access controls or permissions.

13. The method of claim 1, further comprising, upon generating, one or more insights:
generating statistics based on one or more of player performance, intensity, power, strength, time, effort, health, activity level, shift start, shift end, shift count, distance, displacement, duration, or location.

14. The method of claim 1, further comprising, upon generating, one or more insights:
calculating one or more player locations or estimated locations in a sports complex based on received, altered, aligned or combined sensor data, events or statistics, from one or more player devices, receptor devices, client or event input devices or proxy client or event input devices;
sending one or more player locations or estimated locations to one or more client or event input devices; and
displaying a visual representation of one or more player locations or estimated locations in a sports complex on one or more client or event input devices.

15. The method of claim 14, wherein at least one of the steps occurs at a sports complex that is:
an indoor ice hockey arena, an outdoor ice hockey arena, an indoor floor hockey arena, an outdoor floor hockey arena, a gymnasium, a soccer field, a football field, a track and field stadium, a football stadium, a baseball diamond, a baseball stadium, an arena, a field, a complex, a table, a court, a room, a ring, a diamond or a swimming pool.

16. The method of claim 1, further comprising:
sending, by the first event input device, sensor data, events, or statistics to the server;
receiving, by the second event input device, the sensor data, events, or statistics from the server; and
updating the event input screen on the second event input device to simplify or automate user interface input requirements by using at least one of hiding, highlighting, disabling, deactivating, adding, switching, aligning, linking, combining, or changing user interface fields.

17. The method of claim 1, wherein the first client device, the first event input device, the first proxy client or event input device, the first player device, the first receptor device or the server may generate, alter, align or combine additional sensor data, events or statistics, based on one or more sensor data, events or statistics received from one or more player devices, receptor devices, client or event input devices or proxy client or event input devices.

18. The method of claim 1, further comprising on receiving sensor data, events or statistics at the receptor devices, player devices, event input devices or client devices:
displaying a list of players and associated sensor data, events or statistics related to players that were generated by corresponding player devices, or events generated, altered, aligned or combined by player devices, receptor devices, client devices, event input devices, proxy client devices, event input devices, or the server.

19. The method of claim 18, wherein the displayed list of players and associated sensor data, events, or statistics comprises one or more of the following types of lists:
play-by-play, statistics, player lists, in-game player lists, on-bench player lists, health player lists, activity player lists, performance player lists, intensity player lists, power player lists, location player lists, effort player lists, distance player lists, displacement player lists, notifications, or warnings for the sports game, group of games, player, or group of players.

20. A system for tracking events in a sports game, the system comprising a server configured to:
receive at least one of sensor data, events or statistics from one or more client or event input devices over the communication network where at least one of the one or more client or event input devices is a player device, receptor device or a player device proxied through a client, event or receptor input device, providing sensor data, events or statistics related to a specific player or group of players;
store and manage at least one of the sensor data, events and statistics;
generate one or more insights from the sensor data, events or statistics from the event input devices, for the sports game, group of games, player or group of players;
generate one or more notification messages based on one or more sensor data, events or statistics being within a normal range, outside of a normal range, exceeding a maximum, falling below a minimum or passing an average; and
send one or more notification messages to the first player device, receptor device, client or event input device, or proxy client or event input device.

* * * * *